United States Patent
Tojo et al.

(10) Patent No.: US 7,909,447 B2
(45) Date of Patent: Mar. 22, 2011

(54) INKJET RECORDING METHOD AND INKJET-RECORDING MATERIAL

(75) Inventors: Kaoru Tojo, Shizuoka-ken (JP); Kentaro Shiratsuchi, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 671 days.

(21) Appl. No.: 11/652,029

(22) Filed: Jan. 11, 2007

(65) Prior Publication Data

US 2007/0171267 A1 Jul. 26, 2007

(30) Foreign Application Priority Data

Jan. 23, 2006 (JP) ................................ 2006-014345

(51) Int. Cl.
*C09D 11/00* (2006.01)

(52) U.S. Cl. ..................................... 347/100; 106/31.13

(58) Field of Classification Search .................. 347/100; 106/31.13
See application file for complete search history.

(56) References Cited

U.S. PATENT DOCUMENTS

| 2005/0073563 A1* | 4/2005 | Hanaki et al. .................. 347/100 |
| 2005/0200672 A1* | 9/2005 | Ohya ............................. 347/100 |
| 2006/0065156 A1* | 3/2006 | Ogawa et al. ............... 106/31.43 |

FOREIGN PATENT DOCUMENTS

| JP | 10-100531 A | | 4/1998 |
| JP | 11-321094 A | | 11/1999 |
| JP | 2002-096547 A | | 4/2002 |
| JP | 2002-264485 A | | 9/2002 |
| JP | 2003-145921 A | | 5/2003 |
| JP | 2003-237215 A | | 8/2003 |
| JP | 2004-307831 A | | 11/2004 |
| JP | 2004323605 A | * | 11/2004 |
| JP | 2005-096264 A | | 4/2005 |

OTHER PUBLICATIONS

Japanese Office Action dated Jan. 5, 2010 in corresponding Japanese Patent Application No. 2006-014345.

* cited by examiner

*Primary Examiner* — Laura E Martin
(74) *Attorney, Agent, or Firm* — Sughrue Mion, PLLC

(57) ABSTRACT

An inkjet-recording method of recording an image on an ink-receiving layer, includes the steps of ejecting ink droplets of a water-soluble ink containing a water-soluble phthalocyanine dye on the ink-receiving layer of an inkjet-recording medium having a substrate and an ink-receiving layer which contains a water-soluble bivalent metal salt in an amount of 0.01 to 2 g/m² formed thereon.

15 Claims, No Drawings

INKJET RECORDING METHOD AND INKJET-RECORDING MATERIAL

CROSS-REFERENCE TO RELATED APPLICATION

This application claims priority under 35 USC 119 from Japanese Patent Application No. 2006-014345, the disclosure of which is incorporated by reference herein.

BACKGROUND OF THE INVENTION

1. Field of the Invention

The invention relates to an inkjet-recording method and an inkjet-recording material favorable for recording of a photograde image allowing long-term storage.

2. Description of the Related Art

In recent years, with the rapid progress in the communication industry, various information-processing systems have been developed, and various recording methods and devices suitable for use in these information-processing systems have also been developed and implemented in practice. For example, inkjet-recording methods have become widely used, because inkjet methods allow printing on various recording materials, and the hardware (devices) thereof is relatively cheaper, more compact, and more silent.

Recently, it is possible to obtain so-called high quality photographic-like image recording media, and the important properties required for such media include (1) high drying speed, (2) suitable and uniform ink dot diameter (without ink blurring), (3) favorable graininess, (4) high circularity of ink dot, (5) high color density, (6) high color saturation (without dullness), (7) favorable light and water resistance in recording portions, (8) high whiteness of recording sheet, (9) favorable shelf life of the recording sheet (without yellowing or image blurring during long-term storage), (10) favorable dimensional stability (low curling), (11) favorable operation of hardware, and the like.

However, even when a recording medium satisfies the requirements of the various properties above, if the recorded image is inferior in weather resistance, for example, to light or ozone, images can not retain their high quality, leading to a decrease in the commercial value as a recording material. Thus, it is important for a recording material to give a photographic image quality and also to be capable of maintaining the recorded photographic image for an extended period of time.

Widely known as inkjet-recording media are recording materials prepared by coating a pigment containing a silicon compound, such as silica, and a water-based binder together on a paper substrate.

Metals, metal ions or metal salts have been used for improvement in light stability and color reproducibility and prevention of image blurring and beading, and, for example, there are disclosures on the methods of using a bivalent or higher metal ion or salt, a polyvalent metal cation, or a water-soluble polyvalent metal (see, for example, Japanese Patent Application Laid-Open (JP-A) Nos. 10-100531, 11-321094, 2002-96547, and 2002-264485).

On the other hand, dyes are more susceptible to discoloration by gas, such as ozone, or light than pigments commonly used as colorants, and the image recorded with dye is known to show deterioration during long-term storage.

SUMMARY OF THE INVENTION

The present invention has been made in view of the above circumstances and provides an inkjet-recording method and an inkjet-recording material.

A first aspect of the present invention provides an inkjet-recording method of recording an image on the ink-receiving layer comprising ejecting ink droplets of a water-soluble ink comprising a water-soluble phthalocyanine dye on the ink-receiving layer of an inkjet-recording medium having a substrate and an ink-receiving layer comprising a water-soluble bivalent metal salt in an amount of 0.01 to 2 $g/m^2$ formed on the substrate.

DETAILED DESCRIPTION OF THE INVENTION

Hereinafter, the inkjet-recording method according to the invention and the inkjet-recording material obtained will be described in detail.

In the inkjet-recording method according to the invention, an image is recorded on the ink receiving layer of an inkjet-recording medium having an ink-receiving layer containing a water-soluble bivalent metal salt in an amount of 0.01 to 2 $g/m^2$ on a substrate by ejecting ink droplets of a water-soluble ink containing a water-soluble phthalocyanine dye on the ink receiving layer. It is possible to obtain an image superior in ozone resistance without deterioration in ink-absorbing efficiency by using an ink containing a water-soluble phthalocyanine dye as the water-soluble ink and recording an image on an ink-receiving layer containing a water-soluble bivalent metal salt in a particular amount (0.01 to 2 $g/m^2$).

—Inkjet-Recording Medium—

The inkjet-recording medium for use in the inkjet-recording method according to the invention has a support and at least one ink-receiving layer formed on the substrate, and additionally, other layers as needed.

(Ink-Receiving Layer)

The ink-receiving layer according to the invention at least contains a water-soluble bivalent metal salt at a content in the range of 0.01 to 2 $g/m^2$, preferably together with a water-soluble binder and fine particles, and may contain, as needed, other components such as crosslinker for crosslinking the water-soluble binder, mordant, and others.

—Water-Soluble Metal Salt—

The ink-receiving layer contains at least one water-soluble bivalent metal salt. Presence of a water-soluble bivalent metal salt is effective in preventing deterioration in ozone resistance of the image formed and preserving the image consistently for an extended period of time, when the water-soluble ink described below, an anionic ink containing a water-soluble phthalocyanine dye, is used.

The content of the water-soluble bivalent metal salt in the ink-receiving layer is in the range of 0.01 to 2 $g/m^2$. A water-soluble bivalent metal salt content of less than 0.01 $g/m^2$ restricts improvement in ozone resistance, while a content of more than 2 $g/m^2$ to deterioration in ink-absorbing efficiency and blurring resistance of the recorded image over time. The content is more preferably in the range of 0.01 to 1 $g/m^2$, most preferably in the range of 0.01 to 0.5 $g/m^2$.

The term water-soluble means that, when a saturated aqueous solution of a metal salt is prepared in water at 20° C., the amount of the metal salt contained in 100 g of the saturated solution is 1 g or more.

Examples of the water-soluble bivalent metal salts include water-soluble magnesium salts, water-soluble calcium salts, water-soluble barium salts, water-soluble zinc salts, water-soluble strontium salts, water-soluble titanium salts, water-soluble zirconium salts, and the like, and, among them, water-soluble magnesium and calcium salts are preferable.

The water-soluble metal salts may be used alone or in combination of two or more.

The water-soluble magnesium salt is not particularly limited, and any known magnesium salt may be selected. Examples thereof include magnesium chloride, magnesium sulfate, magnesium nitrate, magnesium phosphate, magnesium chlorate, magnesium acetate, magnesium oxalate, magnesium hydroxide, and the like; among them, magnesium chloride, magnesium sulfate, and magnesium nitrate are preferable; and magnesium chloride is particularly preferable.

Examples of the water-soluble calcium salts include calcium chloride, calcium nitrate, calcium sulfate, calcium hydroxide, calcium citrate, calcium phosphate, calcium acetate, calcium oxalate, and the like; among them, calcium chloride and calcium nitrate are preferable; and calcium chloride is particularly preferable.

Among the water-soluble metal salts above, magnesium chloride, magnesium sulfate, magnesium nitrate, and calcium chloride are preferable, from the point of improvement in image ozone resistance by the water-soluble ink described below containing a water-soluble phthalocyanine dye.

Although not clearly understood, it seems that combined use of a water-soluble bivalent metal salt and a water-soluble phthalocyanine dye in the invention is effective, for example, in accelerating association of the phthalocyanine dye in the ink added from outside and improving the ozone resistance of the resulting image, as will be described below.

—Fine Particles—

The ink-receiving layer for the inkjet-recording medium according to the invention preferably contains at least one kind of fine particles. Addition of the fine particles gives a porous structure, which increases ink-absorbing capability. In particular, addition of the fine particles in an amount of 50 mass % or more, more preferably more than 60 mass %, as the solid content in the ink-receiving layer is preferable, because it results in formation of a more favorable porous structure and gives an inkjet-recording medium having sufficient ink absorptivity.

The solid content of fine particles in the ink-receiving layer is a content calculated on the basis of the components other than water and various solvents in the composition for the ink-receiving layer.

The fine particles may be inorganic or organic, and are preferably inorganic.

The inorganic fine particles are preferably inorganic pigment fine particles, and examples of the inorganic pigment fine particles include silica fine particles, colloidal silica, titanium dioxide, barium sulfate, calcium silicate, zeolite, kaolinite, halloysite, mica, talc, calcium carbonate, magnesium carbonate, calcium sulfate, boehmite, pseudoboehmite, and the like, and silica fine particles are particularly preferable, from the viewpoints of ink absorptivity and color forming properties.

The silica fine particles have the advantage of giving high ink-absorbing and holding efficiency, because of their particularly high specific surface area. Also, because of their low refractive index, silica fine particles have the advantage of providing a ink-receiving layer with transparency, high color density, and favorable color forming properties when dispersed at a suitable micro particle diameter. The transparency of the receiving layer is important from the viewpoint of obtaining high color density, color forming properties and glossiness that are favorable not only in applications demanding transparency such as OHP films but also in applications of recording sheets such as photographic glossy paper.

The average primary particles diameter of the inorganic pigment fine particles is preferably 20 nm or less, more preferably 15 nm or less, and particularly preferably 10 nm or less. When the average primary particle size of the particles is 20 nm or less, the ink-absorbing property can be effectively improved and at the same time, the glossiness of the surface of the ink receiving layer can be enhanced.

In particular with silica fine particles, since the surface has silanol groups, there is easy adhesion between the particles through the hydrogen bonding of the silanol groups, and there is an adhesion effect between the particles through the silanol groups and the water soluble binder. Hence, if the average primary size of the particles is 20 nm or less, then the porosity ratio of the ink receiving layer is high, and a structure with high transparency can be formed, and the ink absorption ability properties can be effectively raised.

Silica fine particles are commonly classified roughly into wet method particles and dry method (gas phase process) particles according to the method of manufacture. By the wet method, silica fine particles are mainly produced by generating an activated silica by acid decomposition of a silicate, polymerizing to a proper degree the activated silica, and coagulating the resulting polymeric silica to give a hydrated silica. Alternatively by the gas phase process, vapor-phase process silica (anhydrous silica) particles are mainly produced by high-temperature gas-phase hydrolysis of a silicon halide (flame hydrolysis process), or by reductively heating and vaporizing quartz and coke in an electric furnace by applying an arc discharge and then oxidizing the vaporized silica with air (arc method). The "vapor-phase process silica" means an anhydrous silica fine particle produced by a gas phase process.

The vapor-phase process silica is different in the density of silanol groups on the surface and the presence of voids therein and exhibits different properties from hydrated silica. The vapor-phase process silica is suitable for forming a three-dimensional structure having a higher void percentage. The reason is not clearly understood. In the case of hydrated silica fine particles have a higher density of 5 to 8 silanol groups/$nm^2$ on their surface. Thus the silica fine particles tend to aggregate densely. While the vapor phase process silica particles have a lower density of 2 to 3 silanol groups/$nm^2$ on their surface. Therefore, vapor-phase process silica seems to cause more scarce, softer aggregations (flocculates), consequently leading to a structure having a higher void percentage.

In the present invention, the vapor phase silica (anhydrous silica) is preferable, with the surface of the silica fine particles having a density of 2 to 3 silanol groups/$nm^2$.

The organic fine particles are preferably polymer fine particles obtained, for example, by emulsion polymerization, microemulsion polymerization, soap-free polymerization, seeding polymerization, or dispersion polymerization, and specific examples thereof include polymer fine particles in the shape of powder, latex or emulsion of polyethylene, polypropylene, polystyrene, polyacrylate, polyamide, silicone resins, phenol resins, and natural polymers.

—Water-Soluble Binder—

The ink-receiving layer for the inkjet-recording medium according to the invention may be suitably constructed to contain at least one water-soluble binder. Addition of a water-soluble binder is effective in preventing cracking and improving the ink-accepting capability by forming an ink-receiving layer of the above porous structure with a high void ratio, together with the fine particles.

Favorable examples of the water-soluble binders include polyvinylalcohol resins, water-soluble cellulosic resins, ether bond-containing resins, carbamoyl group-containing resins, carboxyl group-containing resins, and gelatins.

The polyvinylalcohol resin may be properly selected from known resins, and examples thereof include resins having a hydroxyl group, as its hydrophilic structural unit, including polyvinylalcohol derivatives such as polyvinylalcohol (PVA), cation-modified polyvinylalcohols, anion-modified polyvinylalcohols, silanol-modified polyvinylalcohols, polyvinylacetal, and the like.

The total content of the polyvinylalcohol resins in the ink-receiving layer is preferably 0.1 to 3.0 g/m$^2$, more preferably, 0.5 to 1.0 g/m$^2$.

The cellulosic resin may be properly selected from known resins, and examples thereof include methylcellulose (MC), ethylcellulose (EC), hydroxyethylcellulose (HEC), carboxymethylcellulose (CMC), hydroxypropylcellulose (HPC), hydroxypropylmethylcellulose (HPMC), and the like; methylcellulose (MC), hydroxyethylcellulose (HEC), hydroxypropylcellulose (HPC), and hydroxypropylmethylcellulose (HPMC) are preferable; and hydroxypropylcellulose (HPC) and hydroxypropylmethylcellulose (HPMC) are more preferable, from the viewpoint of image blurring over time.

The total content of the cellulosic resins in the ink-receiving layer comprising multiple layers is preferably 0.1 to 3.0 g/m$^2$, more preferably 0.2 to 1.0 g/m$^2$. A total content of less than 0.1 g/m$^2$ may lead to insufficient water resistance of the inkjet-recording medium, in particular insufficient image blurring over time, for example, under high-humidity condition, while a total content of more than 3.0 g/m$^2$ may cause beading.

The ether bond-containing resin may be properly selected from known resins, and examples thereof include polyethyleneoxide (PEO), polypropyleneoxide (PPO), polyethylene glycol (PEG), polyvinylether (PVE), and the like.

The carbamoyl group-containing resins include resins having hydrophilic amide or amide bonds, and it is properly selected from known resins including polyacrylamide (PAAM), polyvinylpyrrolidone (PVP), and the like.

The carboxyl group-containing resin may be properly selected from known resins having a carboxyl group as the dissociative group, and examples thereof include polyacrylic acid salts, maleic acid resins, alginic acid salts, gelatins, and the like. Other examples include chitins, chitosans, and starch.

The total content of the water-soluble binders is preferably 9 to 40 mass %, more preferably 12 to 33 mass %, with respect to the total solid content in the ink-receiving layer, from the viewpoint of preventing the deterioration in film strength and cracking during drying caused by an excessively smaller content and the deterioration in ink absorptivity by easily clogging of the voids by resin, i.e., decrease in void ratio, caused by an excessively higher content.

The fine particles and the water-soluble binder mainly forming the ink-receiving layer may respectively a single raw material or a mixture of multiple raw materials. When at least two or more resins selected from polyvinylalcohol resins, cellulosic resins, ether bond-containing resins, carbamoyl group-containing resins, carboxyl group-containing resins, and gelatins are used in combination among the water-soluble binders above, the total content thereof in the ink-receiving layer is preferably in the range of 2 to 8 g/m$^2$.

The polyvinylalcohol (PVA) for use preferably has a number-averaged polymerization degree of 1,800 or more, more preferably 2,000 or more, for prevention of cracking. When used in combination with silica fine particles, the type of the water-soluble binder used is particularly important, from the viewpoint of transparency. In particular when anhydrous silica is used, PVA is preferably contained as the water-soluble binder, and the PVA resin preferably has a saponification value of 99% or less is preferable, more preferably 60 to 99%, and particularly preferably 70 to, 99%, for forming a three dimensional network structure.

The polyvinylalcohols may be used alone or in combination of two or more.

The PVA contains a hydroxyl group in its structural unit, which, in interaction with the silanol groups on the surface of the silica fine particles, facilitates formation of a three-dimensional network structure having the secondary particles of the silica fine particles as its chain unit. The formation of such three-dimensional network structure seems to give an ink-receiving layer having a porous structure higher in the void ratio.

The cellulosic resin has a hydroxyl group in its structural unit, which, in interaction with the silanol groups on the surface of the silica fine particles, facilitates formation of a three-dimensional network structure having the secondary particles of the silica fine particles as its chain unit. The formation of the three-dimensional network structure seems to give an ink-receiving layer having a porous structure higher in the void ratio. It also has a function to control colorant blurring over time.

Among the water-soluble binders above, polyvinylalcohol (PVA) and cellulosic resins are preferable, and they may be used alone or in combination, however combined use of a polyvinylalcohol (PVA) resin and a cellulosic resin is more preferable.

The porous ink-receiving layer obtained as described above absorbs ink rapidly by capillary phenomenon and provides completely circular ink dots without ink bleeding on the inkjet recording medium.

<Ratio of the Fine Particles to the Water-Soluble Binder Contained>

The ratio (PB ratio: x/y, inorganic pigment fine particles to water soluble binder 1 parts by weight) of the weight of fine particles included (preferably silica fine particles; x) to the weight of water-soluble binder (y) has a great influence on the structure and strength of the ink receiving layer. A larger weight ratio (PB ratio) tends to result in increase in void percentage, pore volume, and surface area (per unit weight).

Specifically the PB ratio (x/y) for the ink receiving layer is preferably 1.5/1 to 10/1, from the viewpoints of suppressing the decrease in layer strength and prevention of cracking thereof when drying which may be caused due to an excessively high PB value, and preventing a decrease in void percentage and thus in ink absorptive property due to an larger amount of voids blocked more easily due to an excessively low PB ratio.

When conveyed in paper-conveying systems of ink jet printers, a stress may be applied to the recording medium. Accordingly, the ink receiving layer should have sufficiently high layer strength. Also from the viewpoints of preventing cracking, peeling, or the like of the ink receiving layer when the ink jet recording medium are cut into sheets, the ink receiving layer should have sufficiently high layer strength. Considering the above, the PB ratio is preferably 5/1 or less. On the other hand, from the viewpoint of ensuring the superior ink absorptive property in ink jet printers, the ratio is more preferably 2/1 or more.

For example, when a coating solution, containing anhydrous silica fine particles, having an average primary particle diameter of 20 nm or less, and a water-soluble binder homogeneously dispersed in an aqueous solution at a PB ratio (x/y) of between 2/1 and 5/1, is applied and dried on a support, a three-dimensional network structure having the secondary particles of silica fine particles as the network chains is formed. Such a coating solution easily provides a translucent porous layer having an average void diameter of 30 nm or less, a void percentage of 50 to 80%, a void specific volume of 0.5 ml/g or more, and a specific surface area of 100 m²/g or more.

—Crosslinking Agent—

The ink-receiving layer according to the invention is preferably a porous layer containing a bivalent water-soluble metal salt, and a water-soluble binder as needed, as well as fine particles, which is previously hardened in crosslinking reaction of the water soluble binder and a crosslinking agent.

The above crosslinking agent may be selected appropriately in relation to the water-soluble binder contained in the ink receiving layer, but boron compounds are preferable, as they allow faster crosslinking reaction. Examples of the boron compounds include borax, boric acid, borate salts [e.g., orthoborate salts, $InBO_3$, $ScBO_3$, $YBO_3$, $LaBO_3$, $Mg_3(BO_3)_2$, and $Co_3(BO_3)_2$], diborate salts [e.g., $Mg_2B_2O_5$, and $CO_2B_2O_5$], metaborate salts [e.g., $LiBO_2$, $Ca(BO_2)_2$, $NaBO_2$, and $KBO_2$], tetraborate salts [e.g., $Na_2B_4O_7 \cdot 10H_2O$], pentaborate salts [e.g., $KB_5O_8 \cdot 4H_2O$, $Ca_2B_6O_{11} \cdot 7H_2O$, and $CsB_5O_5$], and the like. Among them, borax, boric acid and borates are preferable since they are able to promptly cause a cross-linking reaction. Particularly, boric acid is preferable, and the combination of polyvinyl alcohol and boric acid is most preferred.

The content of the above cross-linking agent is preferably an amount of 0.05 to 0.50 parts by weight relative to 1.0 part by weight of the water soluble binder. More preferable is an amount of 0.08 to 0.30 parts by weight. If the amount of inclusion of the cross-linking agent is within the above ranges then the water soluble binder can be effectively be cross-linked and development of cracks and the like can be prevented.

When gelatin and the like are used as a water-soluble resin in the invention, other compounds than the boron compounds, as described below, can be used for the cross-linking agent of the water-soluble resin.

Examples of such cross-linking agents include: aldehyde compounds such as formaldehyde, glyoxal and glutaraldehyde; ketone compounds such as diacetyl and cyclopentanedione; active halogen compounds such as bis(2-chloroethylurea)-2-hydroxy-4,6-dichloro-1,3,5-triazine and 2,4-dichloro-6-S-triazine sodium salt; active vinyl compounds such as divinyl sulfonic acid, 1,3-vinylsulfonyl-2-propanol, N,N'-ethylenebis(vinylsulfonylacetamide) and 1,3,5-triacryloyl-hexahydro-S-triazine; N-methylol compounds such as dimethylolurea and methylol dimethylhydantoin; melamine resin such as methylolmelamine and alkylated methylolmelamine; epoxy resins;

isocyanate compounds such as 1,6-hexamethylenediisocyanate; aziridine compounds such as those described in U.S. Pat. Nos. 3,017,280 and 2,983,611; carboxyimide compounds such as those described in U.S. Pat. No. 3,100,704; epoxy compounds such as glycerol triglycidyl ether; ethyleneimino compounds such as 1,6-hexamethylene-N,N'-bisethylene urea; halogenated carboxyaldehyde compounds such as mucochloric acid and mucophenoxychloric acid; dioxane compounds such as 2,3-dihydroxydioxane; metal-containing compounds such as titanium lactate, aluminum sulfate, chromium alum, potassium alum, zirconyl acetate and chromium acetate; polyamine compounds such as tetraethylene pentamine; hydrazide compounds such as adipic acid dihydrazide; and low molecular compounds or polymers containing at least two oxazoline groups. These cross-linking agent may be used alone, or in combinations of two or more thereof.

The cross-linking agent can be supplied in a number of ways, such as when forming the ink receiving layer, the above cross-linking agents can be added to the ink receiving layer coating solution and/or a coating solution which is used for forming a layer adjacent and contacting the ink receiving layer. Or a coating solution which includes the cross-linking agent can be applied in advance onto the support body and the ink receiving layer coating solution can be coated. Or, a solution of the cross-linking agent can be over-coated onto a coating of an ink receiving layer coating solution after it has dried. From the perspective of manufacturing efficiency, it is preferable that the cross-linking agent is added to the ink receiving layer coating solution or a coating solution for forming an adjacent contacting layer, and the cross-linking agent is supplied at the same time as forming the ink receiving layer. In particular, from the perspective of raising the print image density and glossiness of images, it is preferable to include the cross-linking agent in the coating solution for the ink receiving layer. It is preferable that the concentration of the cross-linking agent in the coating solution for the ink receiving layer is between 0.05 and 10% by mass, and more preferable between 0.1 and 7% by mass.

The cross-linking agent (here, for example the boron compound) is preferably added as follows. When the ink receiving layer is formed through curing by causing cross-linking of the coating layer by applying an coating solution (first solution) for the ink receiving layer, the layer is cured by cross-linking by applying a basic solution (second solution) having a pH value of 7.1 or more on the coating layer, either (1) at the same time for forming the coating layer by applying first solution; or (2) during the drying step of the coating layer formed by applying first solution and also before the coating layer exhibits a decrease in the rate of drying. The boron compound acting as the cross-linking agent may be contained in either first solution or second solution, or alternatively may be contained in both the first solution and second solution.

(Mordant)

In order to raise the water resistance and resistance to the occurrence of bleeding with the passage in time of recording images, a mordant may be added to an ink receiving layer. For the mordant can be used an inorganic mordant such as a cationic polymer (cationic mordant), or a inorganic mordant such as a water soluble metallic compound.

The mordant is a compound other than the water-soluble metal salts and the cationic polyurethane resins described above, and preferably an organic mordant, particularly preferably a cationic mordant.

Presence of a mordant at least in the upper layer of ink-receiving layer improves the water resistance and blurring resistance over time by causing interaction of the layer with solution inkjet ink containing an anionic dye as the colorant and thus stabilizing the colorant.

In such a case, the mordant may be contained in the ink-receiving-layer coating solution (first solution) or the basic solution (second solution), however preferably in the second solution, separated from the solution containing the inorganic fine particles (in particular, vapor-phase silica). If the mordant is added directly into the ink-receiving-layer coating solution, vapor-phase silica carrying anionic charges may cause aggregation, but, if a method for independently preparing and separately coating the mordant-containing solution and the ink-accepting layer-coating solution is employed, there is no concern about aggregation of the inorganic fine particles, which results in increase in the freedom in selecting the mordant.

Among them, use of a basic mordant (for example, polyallylamine) is preferably used. Use of a basic mordant, which functions as a mordant and also as a basic substance, allows preparation of a basic solution without need for an additional basic substance.

For the cationic mordants, polymer mordants with cationic groups of primary, secondary or tertiary amino groups, or quaternary ammonium salt groups are well suited but non-polymer mordants which are cationic also can be used.

For the polymer mordants, preferable are single polymers of monomers with primary, secondary or tertiary amino groups or salts thereof, or quaternary ammonium salt groups (referred to below as mordant monomers), and copolymers or condensation polymers of the mordant monomers with other monomers (referred to below as non-mordant monomers). Also, these polymer mordants can be used in the form of either water soluble polymers, or water dispersible latex particles.

Examples of the above mordant monomer include trimethyl-p-vinylbenzylammonium chloride, trimethyl-m-vinylbenzylammonium chloride, triethyl-p-vinylbenzyl ammonium chloride, triethyl-m-vinylbenzylammonium chloride, N,N-dimethyl-N-ethyl-N-p-vinylbenzylammonium chloride, N,N-diethyl-N-methyl-N-p-vinylbenzylammonium chloride, N,N-dimethyl-N-n-propyl-N-p-vinylbenzylammonium chloride, N,N-dimethyl-N-n-octyl-N-p-vinylbenzylammonium chloride, N,N-dimethyl-N-benzyl-N-p-vinyl benzyl ammonium chloride, N,N-diethyl-N-benzyl-N-p-vinylbenzylammonium chloride, N,N-dimethyl-N-(4-methyl)benzyl-N-p-vinylbenzylammonium chloride, N,N-dimethyl-N-phenyl-N-p-vinylbenzylammonium chloride, trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, trimethyl-m-vinylbenzyl ammonium acetate, N,N,N-triethyl-N-2-(4-vinylphenyl)ethylammonium chloride, N,N,N-triethyl-N-2-(3-vinylphenyl)ethylammonium chloride, N,N-diethyl-N-methyl-N-2-(4-vinylphenyl)ethylammonium chloride, N,N-diethyl-N-methyl-N-2-(4-vinylphenyl)ethylammonium acetate; quaternary compounds obtained by reacting methyl chlorides, ethyl chlorides, methyl bromides, ethyl bromides, methyl iodides, or ethyl iodides of N,N-dimethylaminoethyl(meth)acrylate, N,N-diethylaminoethyl(meth)acrylate, N,N-dimethylaminopropyl(meth)acrylate, N,N-diethylaminopropyl(meth)acrylate, N,N-dimethylaminoethyl(meth)acrylamide, N,N-diethylaminoethyl(meth)acrylamide, N,N-dimethylaminopropyl(meth)acrylamide, or N,N-diethylaminopropyl(meth)acrylamide; and sulfonates, alkyl sulfonates, acetates, or alkyl carboxylates derived from the quaternary compounds by replacement of the anion.

Specific examples of such compounds include monomethyldiallylammonium chloride, trimethyl-2-(methacryloyloxy)ethylammonium chloride, triethyl-2-(methacryloyloxy)ethylammonium chloride, trimethyl-2-(acryloyloxy)ethylammonium chloride, triethyl-2-(acryloyloxy)ethylammonium chloride, trimethyl-3-(methacryloyloxy)propylammonium chloride, triethyl-3-(methacryloyloxy)propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(methacryloylamino)propylammonium chloride, triethyl-3-(methacryloylamino)propylammonium chloride, trimethyl-3-(acryloylamino)propylammonium chloride, triethyl-3-(acryloylamino)propylammonium chloride, N,N-dimethyl-N-ethyl-2-(methacryloyloxy)ethylammonium chloride, N,N-diethyl-N-methyl-2-(methacryloyloxy)ethylammonium chloride, N,N-dimethyl-N-ethyl-3-(acryloylamino)propylammonium chloride, trimethyl-2-(methacryloyloxy)ethyl ammonium bromide, trimethyl-3-(acryloylamino)propylammonium bromide, trimethyl-2-(methacryloyloxy)ethylammonium sulfonate, and trimethyl-3-(acryloylamino)propylammonium acetate.

Examples of other copolymerizable monomers include N-vinylimidazole and N-vinyl-2-methylimidazole.

Further, allylamine, diallyamine, and derivatives and salts thereof may also be used. Examples of these compounds include allylamine, allylamine hydrochloride, allylamine acetate, allylamine sulfate, diallyamine, diallyamine hydrochloride, diallyamine acetate, diallyamine sulfate, diallylmethylamine and the salts thereof (e.g., hydrochloride, acetate, and sulfate salts, and the like), diallylethylamine and the salts thereof (e.g., hydrochloride, acetate, and sulfate salts, and the like), diallyldimethylammonium salts (counter anions thereof including chloride, acetate, and sulfate ions), and the like. These allylamine and diallyamine derivatives are less polymerizable in the amine form, and thus are commonly polymerized in the salt form and desalted thereafter if necessary. Further, polymerization units of N-vinylacetamide and N-vinylformamide can be used, to give vinylamine units by hydrolyzation after polymerization, or salts thereof can be used.

The term "a non-mordant monomer" refers to a monomer that does not have a basic or cationic moiety, such as a primary, secondary or tertiary amino group, a salt thereof, or a quaternary ammonium salt group, and exhibits no or substantially little interaction with dye in inkjet ink.

Examples of non-mordant monomers include alkyl ester (meth)acrylates; cycloalkyl ester(meth)acrylates such as cyclohexyl(meth)acrylate; aryl ester(meth)acrylates such as phenyl(meth)acrylate; aralkyl ester(meth)acrylates such as benzyl(meth)acrylate; aromatic vinyl compounds such as styrene, vinyltoluene and α-methylstyrene; vinyl esters such as vinyl acetate, vinyl propionate and vinyl versatate; allyl esters such as allyl acetate; halogen-containing monomers such as vinylidene chloride and vinyl chloride; vinyl cyanides such as (meth)acrylonitrile; and olefins such as ethylene and propylene.

The alkyl ester (meth)acrylates preferably have 1 to 18 carbon atoms in the alkyl moiety. Examples of such alkyl ester(meth)acrylates include methyl(meth)acrylate, ethyl (meth)acrylate, propyl(meth)acrylate, isopropyl(meth)acrylate, n-butyl(meth)acrylate, isobutyl(meth)acrylate, tert-butyl(meth)acrylate, hexyl(meth)acrylate, octyl(meth)acrylate, 2-ethylhexyl(meth)acrylate, lauryl(meth)acrylate, and stearyl(meth)acrylate.

Particularly preferred are methyl acrylate, ethyl acrylate, methyl methacrylate, ethyl methacrylate, and hydroxyethyl methacrylate.

One kind of non-mordant monomer may be used alone or two or more kinds of non-mordant monomers may be used in combination.

Preferred examples of the polymeric mordant also include poly diallyldimethyl ammonium chloride, poly methacryloyloxyethyl-β-hydroxyethyldimethylammonium chloride, poly ethyleneimine, polyallylamine and modified derivatives thereof, polyallylamine hydrochloride, polyamide-polyamine resins, cationized starch, dicyandiamide formalin condensates, dimethyl-2-hydroxypropylammonium salt polymers, polyamidine, polyvinylamine, and an acrylic cationic emulsion of an acryl silicone latex described in JP-A Nos. 10-264511, 2000-43409, 2000-343811 and 2002-

120452 ("AQUABRID ASi-781, ASi784, ASi-578 and ASi-903 (Trade Name) manufactured by Daicel Chem. Ind. Ltd.).

Polyallylamine- and polyallylamine-modified derivatives are particularly preferable.

Polyallylamine-modified derivatives are polyallyamine adducts containing 2 to 50 mol % of acrylonitrile, chloromethylstyrene, TEMPO, epoxyhexane, sorbic acid, or the like; adducts with 5 to 10 mol % of acrylonitrile, chloromethylstyrene, or TEMPO are preferable; and polyallylamine adducts with 5 to 10 mol % of TEMPO are particularly preferable, from the viewpoint of ozone discoloration resistance.

Regarding the molecular weights of the mordants, the weight average molecular weight is preferably 2000 to 300,000. If the molecular weight is in this range then the water resistance and the tendency to develop bleeding resistance with the lapse of time can be further improved.

Other Components

In addition, the ink receiving layer is constructed to contain the following components if necessary.

To restrain the deterioration of the ink colorant, anti-fading agents such as various ultraviolet absorbers, antioxidants and singlet oxygen quenchers may be contained.

Examples of the ultraviolet absorbers include cinnamic acid derivatives, benzophenone derivative and benzotriazolyl phenol derivatives. Specific examples include α-cyano-phenyl cinnamic acid butyl, o-benzotriazole phenol, o-benzotriazole-p-chlorophenol, o-benzotriazole-2,4-di-t-butyl phenol, o-benzotriazole-2,4-di-t-octyl phenol. A hindered phenol compound can be also used as an ultraviolet absorber, and phenols in which at least one or more of the second place and/or the sixth place is substituted by a branching alkyl group is preferable.

A benzotriazole based ultraviolet absorber, a salicylic acid based ultraviolet absorber, a cyano acrylate based ultraviolet absorber, and oxalic acid anilide based ultraviolet absorber or the like can be also used. For instance, the ultraviolet absorbers as described in JP-A Nos. 47-10537, 58-111942, 58-212844, 59-19945, 59-46646, 59-109055 and 63-53544, Japanese Patent Application (JP-B) Nos. 36-10466, 42-26187, 48-30492, 48-31255, 48-41572, 48-54965 and 50-10726, U.S. Pat. Nos. 2,719,086, 3,707,375, 3,754,919 and 4,220,711 or the like.

An optical brightening agent can be also used as an ultraviolet absorber, and specific examples include a coumalin based optical brightening agent. Specific examples are described in JP-B Nos. 45-4699 and 54-5324 or the like.

Examples of the antioxidants are described in EP 223739, 309401, 309402, 310551, 310552 and 459416, D.E. Patent No. 3435443, JP-A Nos. 54-48535, 60-107384, 60-107383, 60-125470, 60-125471, 60-125472, 60-287485, 60-287486, 60-287487, 60-287488, 61-160287, 61-185483, 61-211079, 62-146678, 62-146680, 62-146679, 62-282885, 62-262047, 63-051174, 63-89877, 63-88380, 66-88381, 63-113536, 63-163351, 63-203372, 63-224989, 63-251282, 63-267594, 63-182484, 1-239282, 2-262654, 2-71262, 3-121449, 4-291685, 4-291684, 5-61166, 5-119449, 5-188687, 5-188686, 5-110490, 5-1108437 and 5-170361, JP-B Nos. 48-43295 and 48-33212, U.S. Pat. Nos. 4,814,262 and 4,980,275.

Specific examples of the antioxidants include 6-ethoxy-1-phenyl-2,2,4-trimethyl-1,2-dihydroquinoline, 6-ethoxy-1-octyl-2,2,4-trimethyl-1,2-dihydroquinoline, 6-ethoxy-1-phenyl-2,2,4-trimethy-1,2,3,4-tetrahydroquinoline, 6-ethoxy-1-octyl-2,2,4-trimethyl-1,2,3,4-tetrahydroquinoline, nickel cyclohexanoate, 2,2-bis(4-hydroxyphenyl)propane, 1,1-bis(4-hydroxyphenyl)-2-ethylhexane, 2-methy-4-methoxy-diphenylamine, 1-methyl-2-phenyl indole.

These antioxidants can be used singly or in combinations of two or more. The antioxidants can be dissolved in water, dispersed, emulsified, or they can be included within microcapsules. The amount of the anti-fading agents added is preferably 0.01 to 10% by mass, relative to the total ink receiving layer coating solution.

In addition, in order to prevent curl, it is preferable to include organic solvents with a high boiling point in the ink receiving layer.

For the above high boiling point organic solvents, water soluble ones are preferable. As water soluble organic solvents with high boiling points, the following alcohols are examples: ethylene glycol, propylene glycol, diethylene glycol, triethylene glycol, glycerin, diethylene glycol monobutylether (DEGMBE), triethylene glycol monobutyl ether, glycerin monomethyl ether, 1,2,3-butane triol, 1,2,4-butane triol, 1,2,4-pentane triol, 1,2,6-hexane triol, thiodiglycol, triethanolamine, polyethylene glycol (average molecular weight of less than 400). Diethylene glycol monobutylether (DEGMBE) is preferable.

The amount of the above high boiling point organic solvents used in the coating solution for the ink receiving layer is preferably 0.05 to 1% by mass, and particularly favorable is 0.1 to 0.6% by mass.

Also, for the purpose of increasing the dispersability of the inorganic pigment fine particles, each of the types of inorganic salts can have the pH adjusted with the inclusion of acids or alkalis.

Further, in order to suppress the generation of on the surface of friction charging and exfoliation charging, conductive metallic compound fine particles, and matting agents, for reducing the surface friction, can be included.

Support Body

A transparent support body made of a transparent material such as plastic, and opaque support body composed of an opaque material such as paper can be used as a support which can be used for the invention. Especially, a transparent support or an opaque support having high glossiness is preferably used to make the best use of the transparency of the ink receiving layer.

In addition, read-only optical disc such as CD-ROM and DVD-ROM and the like, write-once optical disc such as CD-R, DVD-R and the like, and rewritten optical disc may be used as support body and ink-receiving layer may be applied on the label side.

Material which is transparent and can endure radiant heat when used on OHPs and backlight displays is preferable as a material which can be used for the above transparent support. Examples of the material include polyesters such as polyethylene terephthalate (PET); polysulfone, polyphenylene oxide, polyimide, polycarbonate and polyamide. The polyesters are preferable among them, and especially, polyethylene terephthalate is preferable. The thickness of the transparent support is not particularly limited. However, a thickness of 50 to 200 μm is preferable in view of easy of use.

An opaque support having high glossiness whose the surface on which the ink receiving layer is formed has a glossiness degree of 40% or more is preferable. The glossiness degree is a value determined according to the method described in JIS P-8142 (paper and a paperboard 75 degree method for examining specular glossiness degree). Examples of such supports include the following supports.

Examples include paper supports having high glossiness such as art paper, coat paper, cast coat paper and baryta paper used for a support for a silver salt photography or the like; polyesters such as polyethylene terephthalate (PET), cellulose esters such as nitrocellulose, cellulose acetate and cellulose acetate butyrate, opaque high glossiness films which are constituted by incorporating white pigment or the like in plastic films such as polysulfone, polyphenylene oxide, polyimide, polycarbonate and polyamide (a surface calendar treatment may be performed); or, supports in which a coating layer made of polyolefin which either does or does not contain a white pigment is formed on the surface of a high glossiness film containing the various paper supports, transparent supports or white pigment or the like. Also, white pigment-containing foam polyester film (for instance, a foam PET which contains the polyolefin fine particles, and contains voids formed by drawing out) is preferable. Further, a resin coated paper for silver halide salt photographic use is suitable.

The thickness of the opaque support is not particularly limited. However, a thickness of 50 to 300 μm is preferable in view of ease of handling.

One treated by corona discharge treatment, glow discharge treatment, flame treatment or ultraviolet radiation treatment or the like may be used for the surface of the support, so as to improve wetting and adhesion properties.

Next, base paper used for paper support, such as resin coated paper, will be described.

The base paper is mainly made of wood pulp, and is made by using a synthetic pulp, such as polypropylene, in addition to the wood pulp if necessary, or a synthetic fiber such as nylon or polyester. LBKP, LBSP, NBKP, NBSP, LDP, NDP, LUKP and NUKP can be used as the wood pulp. It is preferable to use more LBKP, NBSP, LBSP, NDP and LDP which contain a lot of short fibers. The ratio of LBSP and/or LDP is preferable in the range between 10% by mass and 70% by mass A chemical pulp with few impurities (sulfate pulp and sulfite pulp) is preferably used as the pulp, and a pulp in which whiteness is improved by bleaching, is useful.

Sizing agents such as higher fatty acid and alkyl ketene dimer, white pigments such as calcium carbonate, talc and titanium oxide, paper reinforcing agents such as starch, polyacrylamide and polyvinyl alcohol, optical brightening agents, water retention agents such as polyethylene glycols, dispersing agents, and softening agents such as a quaternary ammonium can be appropriately added to the base paper.

The freeness of pulp used for papermaking is preferably 200 to 500 ml as stipulated in CSF. The sum of 24 mesh remainder portions and 42 mesh remainder portions is preferably 30 to 70% by mass as stipulated in JIS P-8207. 4 mesh remainder portion is preferably 20% by mass or less.

The basis weight of the base paper is preferably 30 to 250 g, and more preferably 50 to 200 g. The thickness of the base paper is preferably 40 to 250 μm. High smoothness can be imparted to the base paper by calendar treatment at the making paper step or after paper making. The density of the base paper is generally 0.7 to 1.2 g/m$^2$ (JIS P-8118). In addition, the strength of the base paper is preferably 20 to 200 g under the conditions of JIS P-8143.

A surface size agent may be coated on the surface of the base paper, and a size agent which is the same as size which can be added to the base paper can be used as the surface size agent. It is preferable that the pH of the base paper is 5 to 9 when measured by a hot water extraction method provided by JIS P-8113.

In general, the both front and back surfaces of the base paper can be coated with polyethylene. Main examples of polyethylenes include low density polyethylene (LDPE) and/or high density polyethylene (HDPE) but others such as LLDPE and polypropylene can be also used in part.

Especially, in the polyethylene layer on the side on which the ink receiving layer is formed, it is preferable that rutile type or anatase type titanium oxide, an optical brightening agent or ultramarine blue pigment are added to polyethylene, and thereby the degree of opaqueness, whiteness and color are improved, as is widely performed for printing papers for photographs. Herein, the content of titanium oxide is preferably about 3 to 20% by mass, and more preferably 4 to 13% by mass to polyethylene. The thickness of the polyethylene layer is not limited to a particular thickness, and more preferably 10 to 50 μm. Further, an undercoat layer can be formed to give adhesion of the ink receiving layer on the polyethylene layer. Water polyester, gelatin, and PVA are preferably used as the undercoat layer. The thickness of the undercoat layer is preferably 0.01 to 5 μm.

A polyethylene coated paper sheet may be used as glossy paper, or when polyethylene is coated on the base paper sheet by melt-extrusion a matte surface or silk finish surface may be formed by applying an embossing treatment, as obtainable in usual photographic printing paper sheets.

On the support body a back coat layer can be provided, and white pigments, water soluble binders and other components can be used as additive components of the back coat layer.

Examples of the white pigment contained in the back coat layer include inorganic white pigments such as calcium carbonate light, calcium carbonate heavy, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate and magnesium hydroxide; and organic pigments such as styrene plastic pigments, acrylic plastic pigments, polyethylene, microcapsules, urea resin and melamine resin.

Examples of the aqueous binders used for the back coat layer include water soluble polymers such as styrene/maleic acid copolymer, styrene/acrylate copolymer, polyvinyl alcohol, silanol modified polyvinyl alcohol, starch, cationic starch, casein, gelatin, carboxymethyl cellulose, hydroxyethyl cellulose and polyvinyl pyrrolidone; and water dispersible polymers such as styrene-butadiene latex and acrylic emulsion. Other components contained in the back coat layer include defoaming agents, foaming suppressing agents, dyes, optical brighteners, preservatives and water-proofing agents.

—Method of Producing Inkjet-Recording Medium—

Hereinafter, the method of producing an inkjet-recording medium will be described in detail.

The inkjet-recording medium according to the invention can be produced by forming a crosslinked hardened ink-receiving layer on a substrate, in a step of forming a coated layer on a substrate by applying a first solution (ink-receiving-layer coating solution) containing a water-soluble binder and a crosslinking agent which crosslinks the water-soluble binders and a step of crosslinking and hardening the coated layer by applying a second solution containing a basic compound (basic solution at pH 7.1 or higher) on the coated layer either (1) simultaneously with application of the first solution or (2) in the period before the coated layer shows a falling drying rate during drying of the coated layer. The second solution is added then in such a manner that at least one of the first and second solutions (preferably the second solution) contains a water-soluble metal salt and the addition amount of the water-soluble metal salt becomes 0.01 to 2 g/m$^2$.

In the method of producing an inkjet-recording medium according to the invention, it is possible to place the water-soluble metal salt in the area close to the surface layer of ink-receiving layer in a greater amount, by applying an ink-receiving-layer coating solution and a basic solution containing a water-soluble metal salt, and adding a second solution containing a water-soluble metal salt either in the period of (1) or (2) as described above, and thus, to give an inkjet-recording medium allowing recording of an image superior in ozone resistance.

The crosslinking agent for crosslinking the water-soluble binder may be present not only in the first solution but also in the second solution, and the crosslinked and hardened ink-receiving layer has advantages, for example, in ink absorptivity and film cracking resistance and is also effective in improving appearance and preventing failures such as ink repulsion and others.

The water-soluble metal salt contained in the ink-receiving layer may be contained in at least one of the first and second solutions, however the water-soluble metal salt is preferably contained in the second solution, for effective improvement in the ozone resistance of image. The entire water-soluble metal salt may not be contained in the first solution, and part of the water-soluble metal salt may be present in the first solution.

The mordant is preferably added in such a way that it is distributed in a layer closer to the ink-receiving layer surface having a thickness of 10 to 60% with respect to the entire thickness of the ink-receiving layer. Such a layer may be formed in any method, for example, by a method for (1) preparing a coat layer containing fine particles, a water-soluble binder, and a crosslinking agent and then coating a mordant-containing basic solution (second solution) thereon, (2) applying a coating solution containing fine particles and water-soluble binder and a basic solution containing a mordant (second solution) simultaneously by multi-layer application, or the like. Alternatively, the mordant-containing basic solution (second solution) may contain fine particles, a water-soluble binder, a crosslinking agent, and others. Such a composition is favorable, because it results in higher distribution of the mordant in the desirable region of the ink-receiving layer, facilitating color forming properties of the colorant in inkjet ink, further improving the color density, blurring resistance over time, printed-area glossiness, water and ozone resistance of the character and image after printing. Part of the mordant may be contained in the layer formed on the support, and the mordant may be the same as or different from that applied later.

The first solution, i.e., the ink-receiving-layer coating solution containing inorganic pigment fine particles, PVA, a boron compound (crosslinking agent), and a cationic polyurethane resin, can be prepared, for example, by the following method: It is prepared, for example, by adding silica fine particles having an average primary particle diameter of 20 nm or less into water (e.g., at 10 to 20 mass %) and dispersing the particles in a high speed-revolution wet colloid mill ("CLEARMIX", manufactured by M Technique Co., Ltd.), for example, at a high rotational frequency of 10,000 rpm (preferably 5,000 to 20,000 rpm) for 20 minutes (preferably, 10 to 30 minutes); adding a boron compound (e.g., at 0.5 to 20 mass % of silica) thereto and dispersing the mixture under the same condition; and adding an aqueous solution of polyvinylalcohol (PVA) (for example, at approximately ⅓ of silica by weight) and a cationic polyurethane resin thereto, and dispersing the mixture under the same rotational condition. The coating solution obtained is a homogeneous sol, a porous ink-receiving layer having a three-dimensional network structure is formed by applying it on a substrate by the following application method. A pH adjuster, a dispersant, a surfactant, an antifoaming agent, an antistatic agent, or the like may be added additionally to the first solution as needed.

Any one of known various dispersing machines including high-speed-revolution dispersing machine, medium-agitating dispersing machine (such as ball mill and sand mill), ultrasonic dispersing machine, colloid mill dispersing machine, high-pressure dispersing machine, and the like may be used as the dispersing machine for use, however use of a medium-agitating dispersing machine, colloid mill dispersing machine or high-pressure dispersing machine is preferable for efficient dispersion of the fine particle aggregates generated.

Water, an organic solvent, or a mixed solvent thereof may be used as the solvent used in preparation of each coating solution. Examples of the organic solvents for use in the coating solution include alcohols such as methanol, ethanol, n-propanol, i-propanol, and methoxypropanol, ketones such as acetone and methylethylketone, tetrahydrofuran, acetonitrile, ethyl acetate, toluene, and the like.

Alternatively, the second solution (basic solution) is prepared, for example, by the following method: A mordant (e.g., at 0.1 to 5.0 mass %), surfactants (e.g., at a total amount of 0.01 to 1.0 mass %), and a water-soluble metal salt (e.g., at 0.07 to 13.3 mass %), as well as a crosslinking agent as needed (e.g., at 0 to 5.0 mass %) are added to and mixed thoroughly in ion-exchange water. The second solution preferably has a pH of 7.1 or more, and the pH adjustment can be performed, for example, by using ammonia water, sodium hydroxide, calcium hydroxide, or an amino-group-containing compound (ethylamine, ethanolamine, diethanolamine, polyallylamine, or the like). Alternatively, an acid may be added to the second solution for pH adjustment; the acid may be an organic or inorganic acid; and examples thereof include p-toluenesulfonic acid, formic acid, acetic acid, succinic acid, citric acid, phthalic acid, ammonium chloride and the like, and preferable are p-toluenesulfonic acid and ammonium chloride.

The first solution (ink receiving layer coating solution) can be coated by a known method, such as using an extrusion die coater, an air doctor coater, a blade coater, a rod coater, a knife coater, a squeeze coater, a reverse roll coater, or a bar coater.

If applied, the second solution (basic solution) may be applied on the first solution simultaneously with or after application of the first solution (ink-receiving-layer coating solution) before the coated layer shows a falling drying rate. In other words, the second solution is favorably applied thereon while the coated layer after application of the ink-receiving-layer coating solution shows a constant drying rate. The second solution may contain a mordant.

The phrase "before the coating layer exhibits a falling rate of drying" usually means a process within several minutes from immediately after applying the coating solution of the ink receiving layer. During this period the content of the solvent (dispersing medium) in the applied coating solution decreases in proportion to the lapse of time (a constant rate period of drying). The time lapse exhibiting "constant rate period of drying" is described, for example, in Kagaku Kogaku Binran (Chemical Engineering Handbook), pp. 707-712, Maruzen Co. Ltd., 25 Oct. 1980.

The period in which the coating layer is dried until it exhibits a falling rate of drying after applying the first solution, is usually, at 50 to 180° C., for 0.5 to 10 minutes (preferably, 0.5 to 5 minutes). While this drying time differs depending on the amount of coating, the aforementioned range is usually appropriate.

Examples of the method for applying the solution before the first coating layer exhibits a falling rate period of drying include (1) further coating the second solution on the coating layer, (2) spraying the second solution, and (3) dipping the support on which the coating layer has been disposed in the second coating solution.

The method used for applying coating second solution in the above method (1) includes known application method using, for example, a curtain flow coater, an extrusion die coater, an air doctor coater, a blade coater, a rod coater, a knife coater, a squeeze coater, a reverse roll coater and a bar coater. The extrusion die coater, curtain flow coater or bar coater are preferably used to prevent the coater from contacting with the already formed first coating layer.

The coating amount of the second solution is generally 5 to 50 g/m$^2$, and preferably 10 to 30 g/m$^2$.

After application of the second coating solution, generally drying and curing is carried out at 40 to 180° C. for 0.5 to 30 minutes. Heating at a temperature of 40 to 150° C. for 1 to 20 minutes is preferable. For example, when borax or boric acid is included in the first coating solution as a cross-linking agent, then carrying out heating to a temperature of 60 to 100° C. for 5 to 20 minutes is preferable.

When the basic solution (coating second solution) is applied simultaneously with applying the coating solution (coating first solution) for the ink receiving layer, first and second coating solutions are simultaneously provided on the support so that coating first solution contacts the support (multi-layer coating), and then the solutions are dried to thereby form the ink receiving layer.

Coating methods using, for example, an extrusion die coater or a curtain flow coater may be employed for simultaneous application (multilayer coating). When the coated layers are dried after the simultaneous coating, these layers are usually dried by heating at 40 to 150° C. for 0.5 to 10 minutes, and preferably by heating at 40 to 100° C. for 0.5 to 5 minutes.

When the coating solutions are simultaneously applied (multi-layer coating) using, for example, an extrusion die coater, the simultaneously supplied two coating solutions are laminated at near the outlet of the extrusion die coater, or immediately before the solutions are transferred onto the support, and are laminated on the support to make a dual layer. Since the two layers of the coating solutions laminate before application onto the support, they tend to undertake cross-linking at the interface between the two solutions while the solutions are transferred onto the support. This results in the supplied two solutions readily become viscous by being mixed with each other in the vicinity of an outlet of the extrusion die coater, occasionally leading to trouble in the coating operation. Accordingly, it is preferable to simultaneously arrange triple layers by presenting a barrier layer solution (intermediate layer solution) between the first solution and second solution, at the same time as applying of the first and second coating solutions.

The barrier-layer solution can be selected without particularly limitations, and examples thereof include an aqueous solution containing a trace amount of water-soluble binder, water, and the like. The water-soluble binders are used considering the coating property of the solution, for example, for increasing the viscosity of the solution, and examples thereof are polymers including cellulosic resins (e.g., hydroxypropylmethylcellulose, methylcellulose, hydroxyethylmethyl cellulose, and the like), polyvinylpyrrolidone, gelatin, and the like. The barrier-layer solution may also contain a mordant.

After forming on the support, the ink receiving layer may be subjected to calendering by passing through roll nips under heat and pressure, for example, by using a super calender or gloss calender, or the like, for improvement in the surface smoothness, glossiness, transparency, and strength of the coated film. However, because calendering sometimes causes decrease in void ratio (i.e., decrease in ink absorptive property), it is necessary carry out calendering under conditions set to reduce the decrease in void percentage.

The roll temperature during calendering is preferably 30 to 150° C. more preferably 40 to 100° C., and the linear pressure between rolls during calendering is preferably 50 to 400 kg/cm and more preferably 100 to 200 kg/cm.

In the invention, the thickness of the ink receiving layer should be decided, in the case of inkjet recording, according to the void percentage of the layer, as the layer should have a sufficient absorption capacity allowing absorption of all droplets. For example, if the ink quantity is 8 nl/mm$^2$ and the void percentage is 60%, a film having a thickness of about 15 µm or more is required. Considering the above, ink receiving layer for ink jet recording preferably has a thickness of 10 to 50 µm.

In addition, the median diameter of the pores in the ink receiving layer is preferably 0.005 to 0.030 µm, and more preferably 0.01 to 0.025 µm. The void percentage and the pore median size may be determined by using a mercury porosimeter (trade name: "Poresizer 9320-PC2", manufactured by Shimadzu Corporation).

The ink receiving layer is preferably higher in transparency, and the haze value, an indicator of transparency, of the ink receiving layer formed on a transparent film support is preferably 30% or less and more preferably 20% or less. The haze value may be determined by using a hazemeter (trade name: HGM-2DP, manufactured by Suga Test Instrument Co., Ltd.).

—Water-Soluble Ink—

The water-soluble ink used for the inkjet-recording method of the invention contains at least a water-soluble phthalocyanine dye, and may contain additionally a properly selected solvent, a surfactant, an antiseptic, an antirust, or the like as needed.

It is possible to record an image superior in ozone resistance while preserving favorable ink-absorbing efficiency, because the image is recorded by ejecting an ink containing a water-soluble phthalocyanine dye as the water-soluble ink on the ink-receiving layer of the inkjet-recording medium according to the invention described above.

—Water-Soluble Phthalocyanine Dye—

Hereinafter, the water-soluble phthalocyanine dye will be described in detail.

The term water-soluble means that, when a saturated aqueous solution of a water-soluble phthalocyanine dye at 20° C. is prepared, the water-soluble phthalocyanine dye is contained in 100 g of the saturated solution in an amount of 1 g or more. The dye is preferably dissolved in ink solvent mainly containing water.

Any one of known phthalocyanine dyes such as C.I. Direct Blue 87 and C.I. Direct Blue 199 may be used as the water-soluble phthalocyanine dye. Among them, an associative phthalocyanine dye is preferable for improvement in ozone resistance. The associative phthalocyanine dye is a dye that has a molar absorption coefficient ($\epsilon$) lower in a concentrated ink solution as compared with a dilute solution because of association among the dyes. Such a dye shows the following concentration dependency of molar absorption coefficient in aqueous solution.

When the molar absorption coefficient, as determined from the absorbance at the maximum wavelength ($\lambda$max) in the spectroscopic absorption curve obtained when an aqueous dye solution at a concentration of 0.1 mmol/l is measured by using a cell having an optical path length of 1 cm, is designated as $\epsilon 1$ and the molar absorption coefficient, as determined from the absorbance at the maximum wavelength in the spectroscopic absorption curve obtained when an aqueous solution of the dye at a concentration of 0.2 mmol/l is measured by using a cell having an optical path length of 5 μm, as ε2, a water-soluble phthalocyanine dye satisfying the relationship of ε1/ε2>1.2 is preferable, and such a dye is an associative dye. In the invention, use of such an associative dye accelerates association of dyes in interaction with the water-soluble metal salt when applied on the ink-receiving layer of the inkjet-recording medium according to the invention, improving the ozone resistance of the ink further.

In other words, such a dye shows a phenomenon that the molar absorption coefficient is lower in a high-concentration solution than in a dilute solution because of association of two or more of dye molecules. Thus, it characteristically shows a lower apparent absorbance after correction with solution concentration, in a solution at a higher concentration. The absorbance of a dilute solution can be measure in a normal cell, however measurement of the absorption coefficient in a higher-concentration dye solution demands a cell significantly shorter in optical path length. For this reason, the dye-concentration dependence of absorbance, as determined by comparison of the absorbencies determined in a solution crystal cell and in a long-optical path cell, is used as an indicator of the favorable colorant property. The variation of the molar absorption coefficient ratio ε1/ε2 seems to be based on the difference in the association degree of dye, and a dye having a ratio of 1.2 or more shows distinct image fastness. The upper limit of the molar absorption coefficient ratio ε1/ε2 is not particularly limited, if the absorbance is not extremely lower in concentrated solution, but generally 3 or less.

The molar absorption coefficient ratio ε1/ε2 is preferably 1.2 to 2.0, more preferably 1.2 to 1.5.

The associative dye (water-soluble phthalocyanine dye) preferably contains an associative group. The associative group means a group having at least a bonding site (or functional group) capable of forming a hydrogen bond intermolecularly. One or more bonding sites may be present in a group. Examples of the bonding sites include hydroxyl, amino, amide, oxide, and other bonds that can form a hydrogen bond with the same or different group. The associative group may form a hydrogen bond between the phthalocyanine dye and any other additive.

For reducing the reactivity of an electrophilic agent ozone, it is preferably to raise the oxidation potential of the phthalocyanine to higher than 1.0 V (vs. SCE), for example by partially substituting the carbon atoms in phthalocyanine skeleton by heteroatoms similarly to azaphthalocyanines, or introducing an electron-withdrawing group into the phthalocyanine skeleton. The oxidation potential is preferably higher, and the oxidation potential is more preferably higher than 1.1 V (vs. SCE) and particularly preferably higher than 1.15 V (vs. SCE).

Examples of the associative phthalocyanine dyes include those described in WO Nos. 2002/60994, 2003/811, and 2003/62324; and JP-A Nos. 2003-213167, 2004-75986, 2004-323605, 2004-315758, 2004-315807, and 2005-179469.

The phthalocyanine dyes can be prepared according to the methods described in the patent applications above and also in JP-A Nos. 2004-315729, 2005-41856, and 2004-323511. However, the starting materials, dye intermediates and synthetic routes are not limited thereto.

In particular, the associative dye (water-soluble phthalocyanine dye) is preferably a compound represented by the following Formula (1), the salt thereof, or a mixture thereof with a phthalocyanine compound represented by Formula (2).

—Water-Soluble Phthalocyanine Dye Represented by Formula (1)—

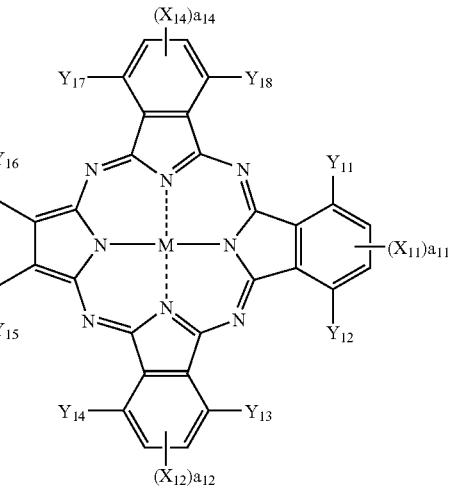

Formula (1)

The phthalocyanine dye represented by Formula (1) is a β-substituted dye having a particular substituent only at the β position of the benzene ring in the phthalocyanine skeleton that is formed by controlling the position of substituent group during preparation, preferably a β-substituted phthalocyanine dye having no substituent at the α positions (having hydrogen atoms at the α positions). Normally, phthalocyanine dyes have substituents such as water-soluble group randomly at α and β positions of the benzene ring in the phthalocyanine skeleton, however phthalocyanine dyes having particular substituents only at the β positions easily cause molecular association and give a layer superior in weather resistance (in particular, ozone resistance).

In Formula (1) above, $X_{11}$, $X_{12}$, $X_{13}$ and $X_{14}$ each independently represents —SO—Z, —SO$_2$—Z, —SO$_2$NR$_{11}$R$_{12}$, a sulfo group, —CONR$_{11}$R$_{12}$, or —CO$_2$R$_{11}$.

Among them, —SO—Z, —SO$_2$—Z, —SO$_2$NR$_{11}$R$_{12}$, or CONR$_{11}$R$_{12}$ is preferable, and —SO$_2$—Z or SO$_2$NR$_{11}$R$_{12}$ is particularly preferable; and —SO$_2$—Z is most preferable. The multiple groups $X_{11}$, $X_{12}$, $X_{13}$ and $X_{14}$ may be the same as or different from each other, and each independently represent one of the groups described above. In addition, $X_{11}$, $X_{12}$, $X_{13}$ and $X_{14}$ each may be the same substituent group; or $X_{11}$, $X_{12}$, $X_{13}$ and $X_{14}$ each may be the same type of substituent group however partially different from each other, for example having the same —SO$_2$—Z group however different in Z, or may be substituent groups respectively different from each other, for example having the groups —SO$_2$—Z and —SO$_2$NR$_{11}$R$_{12}$.

In Formula (1), the groups Z each independently represent an alkyl, alkenyl, aralkyl, aryl, or heterocyclic group that may be substituted additionally with substituent groups.

Z is preferably an alkyl, aryl, or heterocyclic group, and, most preferably among them, a substituted alkyl group, a substituted aryl group, or a substituted heterocyclic group. The substituent group preferably has an asymmetric carbon (racemic mixture), particularly for improvement in dye solubility and ink stability. The substituent group preferably has a hydroxyl, ether, ester, cyano, amide, or sulfonamide group, for improvement in fastness by association.

In Formula (1), $R_{11}$ and $R_{12}$ each independently represents a hydrogen atom or an alkyl, alkenyl, aralkyl, aryl, or heterocyclic group that may be substituted additionally with substituent groups.

Each of $R_{11}$ and $R_{12}$ is preferably a hydrogen atom or an alkyl, aryl, or heterocyclic group, and, among them, it is most preferably a hydrogen atom or a substituted alkyl, aryl, or heterocyclic group. However, it is not preferable that both $R_{11}$ and $R_{12}$ are hydrogen atoms. The substituent group preferably has an asymmetric carbon (racemic mixture) especially for improvement in dye solubility and ink stability. In addition, a hydroxyl, ether, ester, cyano, amide, or a sulfonamide group is included in the substituent group, for improvement in color fastness by association.

The alkyl group means a straight-chain, branched, or cyclic group (monocyclic or polycyclic, and bridged or spiro if polycyclic) or a monovalent saturated hydrocarbon group in combination thereof, and examples thereof include cycloalkyl and cycloalkyl-alkyl groups and the like, and also substituted alkyl groups if they can be substituted with additional substituent groups. The alkenyl group means a straight-chain, branched, or cyclic group (monocyclic or polycyclic, and bridged or spiro if polycyclic) or a monovalent unsaturated hydrocarbon group in combination thereof, excluding an aromatic group, having one or more carbon-carbon double bonds, and examples thereof include substituted alkenyl groups if they can be substituted with substituent groups. The substituted alkyl group means an alkyl group of which one or more hydrogen atoms are substituted with other substituents. Other substituted aryl groups and others are also the same as those above.

The alkyl group represented by $R_{11}$, $R_{12}$, or Z is preferably an alkyl group having 1 to 30 carbon atoms. A branched alkyl group is preferable, and in particular, that having an asymmetric carbon (racemic mixture) is particularly preferable, especially for improvement in dye solubility and ink stability. Examples of the substituent groups include those described when Z, $R_{11}$, $R_{12}$, or $Y_{11}$ to $Y_{18}$ may have substituent groups. Among them, a hydroxyl, ether, ester, cyano, amide, or sulfonamide group is particularly preferable for improvement in dye association and fastness. In addition, the group may have a halogen atom or an ionic hydrophilic group.

The alkenyl group represented by $R_{11}$, $R_{12}$, or Z is preferably an alkenyl group having 2 to 30 carbon atoms. An branched alkenyl group is preferably, and in particular, that having an asymmetric carbon (racemic mixture) is particularly preferable, especially for improvement in dye solubility and ink stability. Examples of the substituent groups include those described below that Z, $R_{11}$, $R_{12}$, and $Y_{11}$ to $Y_{18}$ may have additionally. Among them, a hydroxyl, ether, ester, cyano, amide, or sulfonamide group is effective in improving dye association and image fastness. The group may have a halogen atom or an ionic hydrophilic group additionally.

The aralkyl group represented by $R_{11}$, $R_{12}$, or Z is preferably an aralkyl group having 7 to 30 carbon atoms. A branched alkyl group is preferable, and that having an asymmetric carbon (racemic mixture) is particularly preferable, especially for improvement in dye solubility and ink stability. Examples of the substituent groups include those described below that Z, $R_{11}$, $R_{12}$, and $Y_{11}$ to $Y_{18}$ may have additionally. Among them, a hydroxyl, ether, ester, cyano, amide, or sulfonamide group is effective in improving dye association and fastness of the image. The group may have a halogen atom or an ionic hydrophilic group additionally.

Aryl group represented by $R_{11}$, $R_{12}$, or Z is preferably an aryl group having 6 to 30 carbon atoms. Examples of the substituent groups include those described below that Z, $R_{11}$, $R_{12}$, and $Y_{11}$ to $Y_{18}$ may have additionally. Among them, an electron-withdrawing group, which raises the oxidation potential of dye and improves fastness, is particularly preferable. Typical favorable examples of the electron-withdrawing groups include halogen atoms and heterocyclic, cyano, carboxyl, acylamino, sulfonamide, sulfamoyl, carbamoyl, sulfonyl, imide, acyl, sulfo, and quaternary ammonium groups; and cyano, carboxyl, sulfamoyl, carbamoyl, sulfonyl, imide, acyl, sulfo, and quaternary ammonium groups are still more preferable.

The heterocyclic group represented by $R_{11}$, $R_{12}$, or Z is preferably a five- or six-membered ring, which may be substituted with a fused ring additionally. It may also be an aromatic heterocyclic group or a nonaromatic heterocyclic group. The aromatic heterocyclic group means a group of an aromatic ring in the $6\pi((4n+2)\pi)$ electron system having one or more heteroatoms (n is an integer of 1 or more). The heterocyclic groups represented by $R_{11}$, $R_{12}$, or Z are shown below in the form of heterocyclic ring without substitution site indicated; however the substitution site is not limited, and the ring may be substituted at any positions, for example at 2-, 3-, or 4-position in the case of pyridine. Examples thereof include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline, and the like. Among them, aromatic heterocyclic groups are preferable, and favorable examples thereof include pyridine, pyrazine, pyrimidine, pyridazine, triazine, pyrazole, imidazole, benzimidazole, triazole, thiazole, benzothiazole, isothiazole, benzisothiazole, and thiadiazole. These groups may be substituted additionally, and examples of the substituent groups include those described below that Z, $R_{11}$, $R_{12}$, and $Y_{11}$ to $Y_{18}$ may have additionally. Favorable substituent groups and still more favorable substituent group are respectively the same as those for the aryl group above.

In Formula (1), $Y_{11}$, $Y_{12}$, $Y_{13}$, $Y_{14}$, $Y_{15}$, $Y_{16}$, $Y_{17}$, and $Y_{18}$ each independently represents a hydrogen atom or a monovalent substituent group.

Examples of the monovalent substituent groups represented by $Y_{11}$ to $Y_{18}$ include halogen atoms and alkyl, alkenyl, aralkyl, aryl, heterocyclic, cyano, hydroxyl, nitro, amino, alkylamino, alkoxy, aryloxy, acylamino, arylamino, ureido, sulfamoylamino, alkylthio, arylthio, alkoxycarbonylamino, sulfonamido, carbamoyl, sulfamoyl, sulfonyl, alkoxycarbonyl, heterocyclic oxy, azo, acyloxy, carbamoyloxy, silyloxy, aryloxycarbonyl, aryloxycarbonylamino, imido, heterocyclic thio, phosphoryl, acyl, carboxyl, and sulfo groups. Each group may be substituted additionally.

Each of $Y_{11}$ to $Y_{18}$ is preferably a hydrogen or halogen atom, or an alkyl, aryl, cyano, alkoxy, amido, ureido, sulfonamido, carbamoyl, sulfamoyl, alkoxycarbonyl, carboxyl, or sulfo group, more preferably a hydrogen or halogen atom or a cyano, carboxyl, or sulfo group, and most preferably a hydrogen atom.

When Z, $R_{11}$, $R_{12}$, or $Y_{11}$ to $Y_{18}$ is substituted additionally, the substituent may be any one of the following substituent groups:

Straight- or branching-chain alkyl groups having 1 to 12 carbon atoms, straight- or branching-chain aralkyl groups having 7 to 18 carbon atoms, straight- or branching-chain alkenyl groups having 2 to 12 carbon atoms, straight- or branching-chain alkynyl groups having 2 to 12 carbon atoms, straight- or branching-chain cycloalkyl groups having 3 to 12 carbon atoms, and straight- or branching-chain cycloalkenyl group having 3 to 12 carbon atoms (each of the groups above preferably has a branched chain, particularly that having an asymmetric carbon, for improvement in dye solubility and ink stability, such as methyl, ethyl, propyl, isopropyl, sec-butyl, t-butyl, 2-ethylhexyl, 2-methylsulfonylethyl, 3-phenoxypropyl, trifluoromethyl, or cyclopentyl), halogen atoms (such as chlorine and bromine atoms), aryl groups (such as phenyl, 4-t-butylphenyl, and 2,4-di-t-amylphenyl), heterocyclic groups (such as imidazolyl, pyrazolyl, triazolyl, 2-furyl, 2-thienyl, 2-pyrimidinyl, and 2-benzothiazolyl), a cyano group, a hydroxyl group, a nitro group, a carboxy group, an amino group, alkyloxy groups (such as methoxy, ethoxy, 2-methoxyethoxy, and 2-methanesulfonylethoxy), aryloxy groups (such as phenoxy, 2-methylphenoxy, 4-t-butylphenoxy, 3-nitrophenoxy, 3-t-butyloxycarbamoylphenoxy, and 3-methoxycarbamoyl), acylamino groups (such as acetamido, benzamido, and 4-(3-t-butyl-4-hydroxyphenoxy)butaneamido), alkylamino groups (such as methylamino, butylamino, diethylamino, and methylbutylamino), anilino groups (such as phenylamino and 2-chloroanilino), ureido groups (such as phenylureido, methylureido, and N,N-dibutylureido), sulfamoylamino groups (such as N,N-dipropylsulfamoylamino), alkylthio groups (such as methylthio, octylthio, and 2-phenoxyethylthio), arylthio groups (such as phenylthio, 2-butoxy-5-t-octylphenylthio, and 2-carboxyphenylthio), alkyloxycarbonylamino groups (such as methoxycarbonylamino), sulfonamido groups (such as methanesulfonamido, benzenesulfonamido, and p-toluene sulfonamido), carbamoyl groups (such as N-ethylcarbamoyl and N,N-dibutylcarbamoyl), sulfamoyl groups (such as N-ethylsulfamoyl, N,N-dipropylsulfamoyl, and N-phenylsulfamoyl), sulfonyl groups (such as methanesulfonyl, octanesulfonyl, benzenesulfonyl, and toluenesulfonyl), alkyloxycarbonyl groups (such as methoxycarbonyl and butyloxycarbonyl), heterocyclic oxy group (such as 1-phenyltetrazole-5-oxy and 2-tetrahydropyranyloxy), azo groups (such as phenylazo, 4-methoxyphenylazo, 4-pivaloylaminophenylazo, and 2-hydroxy-4-propanoylphenylazo), acyloxy groups (such as acetoxy), carbamoyloxy groups (such as N-methylcarbamoyloxy and N-pheylcarbamoyloxy), silyloxy groups (such as trimethylsilyloxy and dibutylmethylsilyloxy), aryloxycarbonylamino groups (such as phenoxycarbonylamino), imido groups (such as N-succinimido and N-phthalimido), heterocyclic thio groups (such as 2-benzothiazolylthio, 2,4-di-phenoxy-1,3,5-triazole-6-thio, and 2-pyridylthio), sulfinyl groups (such as 3-phenoxypropylsulfinyl), phosphonyl groups (such as phenoxyphosphonyl, octyloxyphosphonyl, and phenylphosphonyl), aryloxycarbonyl groups (such as phenoxycarbonyl), acyl groups (such as acetyl, 3-phenylpropanoyl, and benzoyl), and ionic hydrophilic groups (such as carboxyl, sulfo, phosphono and quaternary ammonium groups).

The phthalocyanine dye represented by Formula (1) preferably has a water-soluble group to become water soluble.

In Formula (1), $a_{11}$, $a_{12}$, $a_{13}$, and $a_{14}$ each represents the substituent group number of $X_{11}$ to $X_{14}$, and each independently represents an integer of 1 or 2; preferably, $4 \leq a_{11}+a_{12}+a_{13}+a_{14} \leq 6$; and particularly preferably, $a_{11}=a_{12}=a_{13}=a_{14}=1$. The substituent group may preferably be consisted of a water-soluble group and a hydrogen-bonding group.

In Formula (1), M represents a hydrogen atom, a metal element or the oxide, hydroxide or halide thereof.

M is preferably a hydrogen atom; examples of the metal atoms include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi and the like. Examples of the oxides include VO, GeO and the like. Examples of the hydroxides include $Si(OH)_2 Cr(OH)_2$, $Sn(OH)_2$ and the like. Examples of the halides include $AlCl$, $SiCl_2$, $VCl$, $VCl_2$, $VOCl$, $FeCl$, $GaCl$, $ZrCl$ and the like. Among them, Cu, Ni, Zn, Al, and the like are preferable; and Cu is most preferable.

The Pc rings (phthalocyanine ring) may form a dimer (for example, Pc-M-L-M-Pc) or trimer via bivalent connecting groups (L), and the groups M may be the same as or different from each other.

The bivalent connecting group represented by L is preferably an oxy group (—O—), a thio group (—S—), a carbonyl group (—CO—), a sulfonyl group (—SO$_2$—), an imino group (—NH—), a methylene group (—CH$_2$—), or a combination thereof.

As for favorable combination of the substituent groups of the compound represented by Formula (1), a compound having the favorable group above as at least one of the various substituent groups is preferable; a compound having the preferable group above as more of the various substituent groups is more preferable; and a compound having the preferable group above as all of the substituent groups is most preferable.

Specifically, particularly preferable is a phthalocyanine dye represented by Formula (1) having —SO$_2$—Z or SO$_2$NR$_{11}$R$_{12}$ (in particular, —SO$_2$—Z) as $X_{11}$ to $X_{14}$, an alkyl group having 2 to 8 carbon atoms (in particular, propyl group) as Z, an alkyl group having 2 to 6 carbon atoms or an alkyl group having 2 to 6 carbon atoms connected with sulfonamide (preferably having a hydroxyl group additionally as the substituent group) as R$_{11}$ to R$_{12}$, a hydrogen or halogen atom or a cyano, carboxyl, or sulfo group (in particular, hydrogen atom) as $Y_{11}$ to $Y_{18}$, wherein $a_{11}=a_{12}=a_{13}=a_{14}=1$, and M is Cu, Ni, Zn, or Al (in particular, Cu).

As for the chemical structure of the phthalocyanine dye, at least one electron-withdrawing group such as sulfinyl, sulfonyl or sulfamoyl is preferably introduced in each benzene ring of phthalocyanine, to make the total σp value of the substituent groups of the phthalocyanine skeleton 1.6 or more.

Hammett substituent constant, σp value, will be described briefly below. Hammett equation is an empirical equation proposed by L. P. Hammett in 1935 for discussing more quantitatively the effects of substituents on the reaction and equilibrium of benzene derivatives, and is still used widely as appropriate. Two sets of substituent constants σp and σm used in the Hammett equation are found in many general textbooks and described in detail, for example, in "Lange's Handbook of Chemistry" 12th Ed., J. A. Dean Ed., 1979 (McGraw-Hill) and "Kagaku no Ryoiki" Special Issue No. 122, pp. 96 to 103, 1979 (Nankodo Co., Ltd.).

The phthalocyanine dye represented by Formula (1) is generally a mixture of analogues having substituent groups Xn (n=11 to 14) and Ym (m=11 to 18) different in number and site that are formed inevitably because of its preparative method, and thus, the dye represented by Formula (1) is a statistically averaged mixture of these analogues.

The phthalocyanine dye represented by Formula (1) can be prepared according to the methods described or cited, for example, in Shirai and Kobayasi, "Phthalocyanines, Chemistry and Functions" (pp. 1 to 62) published by IPC, and C. C. Leznoff and A. B. P. Lever., "Phthalocyanines, Properties and Applications" (pp. 1 to 54) published by VCH, and others, or a method similar to those.

The phthalocyanine dye represented by Formula (1) can be prepared from a sulfophthalocyanine compound obtained, for example, by allowing a phthalonitrile derivative represented by the following formula (compound P) and/or a diiminoisoindoline derivative (compound Q) at a particular blending ratio to react with the metal derivative represented by the following Formula (A), or allowing them and the 4-sulfophthalonitrile derivative represented by the following formula (compound R) to react with the metal derivative represented by the following Formula (A) at a blending ration properly adjusted.

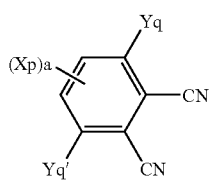

Compound P

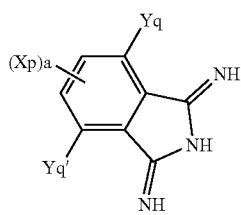

Compound Q

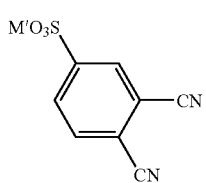

Compound R

In the Formulae above, Xp in the compounds P and Q are the same as $X_{11}, X_{12}, X_{13}$ or $X_{14}$ in Formula (1) above; and Yq and Yq' are the same as $Y_{11}, Y_{12}, Y_{13}, Y_{14}, Y_{15}, Y_{16}, Y_{17}$ or $Y_{18}$ in Formula (1) above. M' in the compound R represents a cation. The cation represented by M' is, for example, an alkali metal ion such as Li, Na, or K, an organic cation such as triethylammonium ion or pyridinium ion, or the like.

 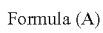 Formula (A)

In Formula (A) above, M is the same as M in Formula (1); Y represents a monovalent or bivalent ligand such as halogen atom, acetate anion, acetylacetonate, or oxygen, and d is an integer of 1 to 4.

In other words, it is possible to introduce a desirable number of desirable substituent groups according to the preparative method above. The preparative method is extremely advantageous, especially when many electron-withdrawing groups are desirably introduced to obtain a desirable water-soluble group/hydrogen-bonding group ratio (numerical ratio) and to make the oxidation potential higher.

The phthalocyanine dye represented by Formula (1) is normally, a mixture of β-substituted dyes, i.e., a mixture of isomers at the substitution sites of Xp, or the compounds represented by the following Formulae (a)-1 to (a)-4. $R_1$ to $R_4$ respectively correspond to $X_{11}$ to $X_{14}$.

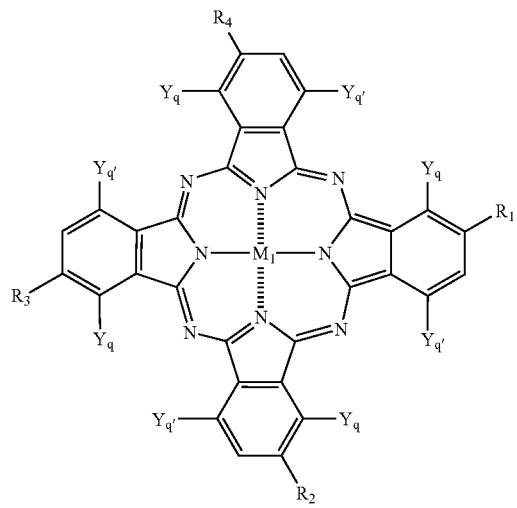

Formula (a)-1

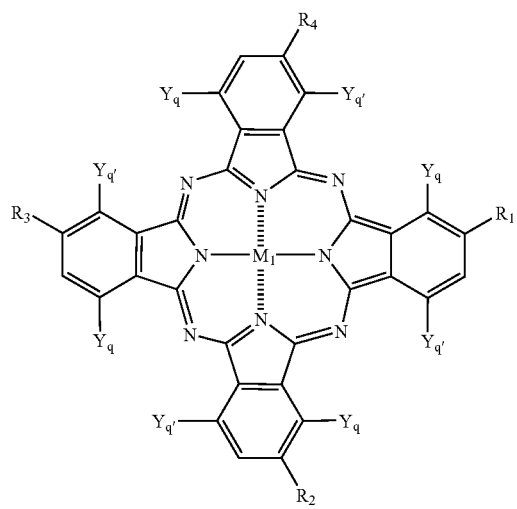

Formula (a)-2

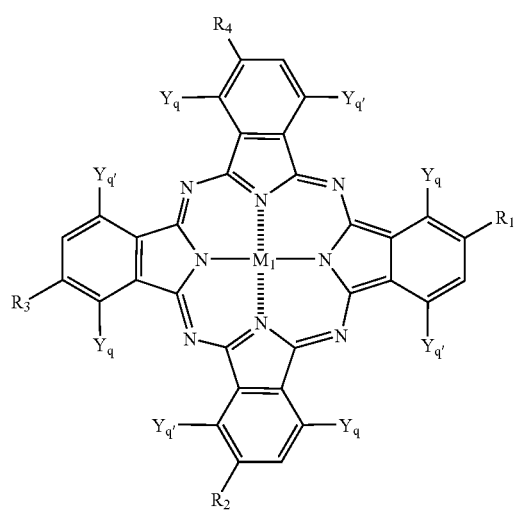

Formula (a)-3

Formula (a)-4

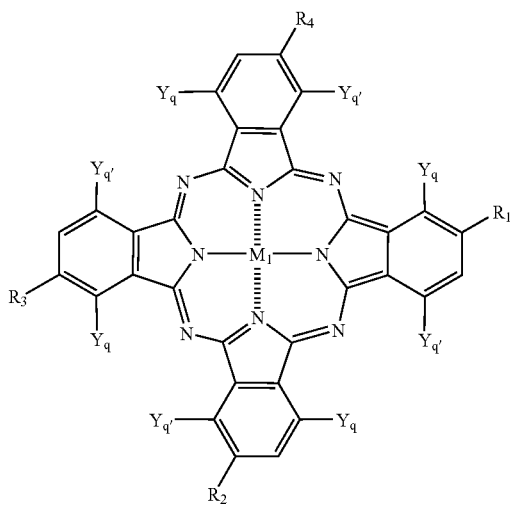

By using the same group as Xp in the preparative method above, it is possible to obtain a β-substituted dye having the same substituent groups at β positions as $X_{11}$, $X_{12}$, $X_{13}$ and $X_{14}$. On the other hand, it is also possible to prepare a dye having the same type of substituent groups that are partially different from each other or a dye having substituent groups different from each other, by using different groups as the groups Xp. Among the dyes represented by Formula (1), dyes having a particular water-soluble group/hydrogen-bonding group ratio (numerical ratio) are particularly preferable, because they allow adjustment of dye solubility and association, ink storability, and others.

Although the detailed reasons are unknown, β-substituted phthalocyanine dyes are distinctively superior, for example, in color tone, light fastness, and ozone gas-resistance, than mixed α- and β-Xp-substituted phthalocyanine dyes (a positions corresponding to $Y_{11}$ to $Y_{18}$), and the β-substituted dyes according to the invention having a particular water-soluble group/hydrogen-bonding group ratio (numerical ratio) are superior in various properties than others.

The phthalocyanine dye represented by Formula (1) can be prepared according to the methods described in JP-A Nos. 2001-226275, 2001-96610, 2001-47013, and 2001-193638. However, the starting materials, dye intermediates and preparative route are not limited to those described in the methods above.

In formula (1) above, at least one of $X_{11}$ to $X_{14}$ is preferably a water-soluble group and at least one of $X_{11}$ to $X_{14}$ is a hydrogen-bonding group.

The water-soluble group, a group contributing to the water solubility of the dye represented by Formula (1) (hereinafter, referred to dye (1)), is a substituent group having at least one ionic hydrophilic group in its structure. The water-soluble group may be a single ionic hydrophilic group or a group having an ionic hydrophilic group.

Examples of the ionic hydrophilic groups include a carboxyl group, hydroxyl groups on aromatic rings including heteroaromatic rings, a sulfo group, a phosphono group, a sulfonamide group, quaternary ammonium groups, and the like. The ionic hydrophilic group is preferably a carboxyl group, a hydroxyl group on aromatic rings including heteroaromatic rings, a sulfo group, and a phosphono group; and, among them, a carboxyl group, a hydroxyl group on aromatic rings including heteroaromatic rings, and a sulfo group is more preferable. In particular, it is the most preferable that at least one of them is a carboxyl group. The hydroxyl group on aromatic rings including heteroaromatic rings or the sulfonamide group is advantageous in that it improves the storage stability of the dye in ink. The carboxyl group, hydroxyl group on aromatic rings including heteroaromatic rings, phosphono group, sulfonamide group and sulfo group may be in the form of salt, and examples of the salt-forming counter ions include an ammonium ion, alkali metal ions (such as lithium ion, sodium ion, and potassium ion) and organic cations (such as tetramethylammonium ion, tetramethylguanidinium ion, and tetramethylphosphonium ion). Among the counter ions, alkali-metal salts are preferable.

The hydrogen-bonding group is not the water-soluble group described above, but means a group having at least one bonding unit (or functional group) that can form a hydrogen bond at least between dye (1) and dye (1) therein. One group may contain one or more bonding units above. Examples of the bonding sites include hydroxyl group, amino group, amide bond, oxide bond, and the like, and the hydrogen bond is formed between the same or different groups.

The hydrogen-bonding group may form a hydrogen bond between dye (1) and the additive described below.

When there are water-soluble and hydrogen-bonding groups copresent in the dye (1) molecule, up to 8 groups, respectively 1 to 7 groups, may be present, but the ratio of water-soluble group (x)/hydrogen-bonding group (y) [numerical ratio] is preferably $(0<x<3)/(1<y<4)$, more preferably $(1<x<3)/(1<y<3)$, and particularly preferably $(x=2)/(y=2)$. The value of the numerical ratio is preferably the number of the group present in a single dye (1) molecule.

The numerical ratio is the statistically average of multiple dye (1) molecules, and even if there are molecules having a numerical ratio outside the lower and upper limits, the dye may be used in the invention if the average of all molecules is in the range above. The numerical ratio can be adjusted, as will be described below, by changing the blending ratio of the raw materials for the dye (1). The numerical ratio can be managed by monitoring absorption-spectrum properties ($\lambda_{max}$, ε value, absorption waveform) of the aqueous solution of dye (1).

Typical examples of the water-soluble groups and the hydrogen-bonding groups of dye (1) are shown below.

Particularly favorable typical examples of the water-soluble groups and the hydrogen-bonding groups are shown below, however the water-soluble and hydrogen-bonding groups for use in the invention are not limited to the following examples.

The water-soluble groups are listed below in the free form, however the water-soluble groups may be in the salt form, and examples of the salt-forming counter ions include an ammonium ion, alkali metal ions (such as lithium ion, sodium ion, and potassium ion) and organic cations (such as tetramethylammonium ion, tetramethylguanidinium ion, and tetramethylphosphonium ion). Among the counter ions, alkali-metal salts are preferable. Hereinafter, examples of the water-soluble groups and the hydrogen-bonding groups are shown.

* Examples of Water-Soluble Groups:

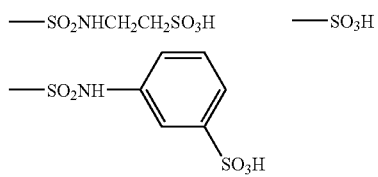

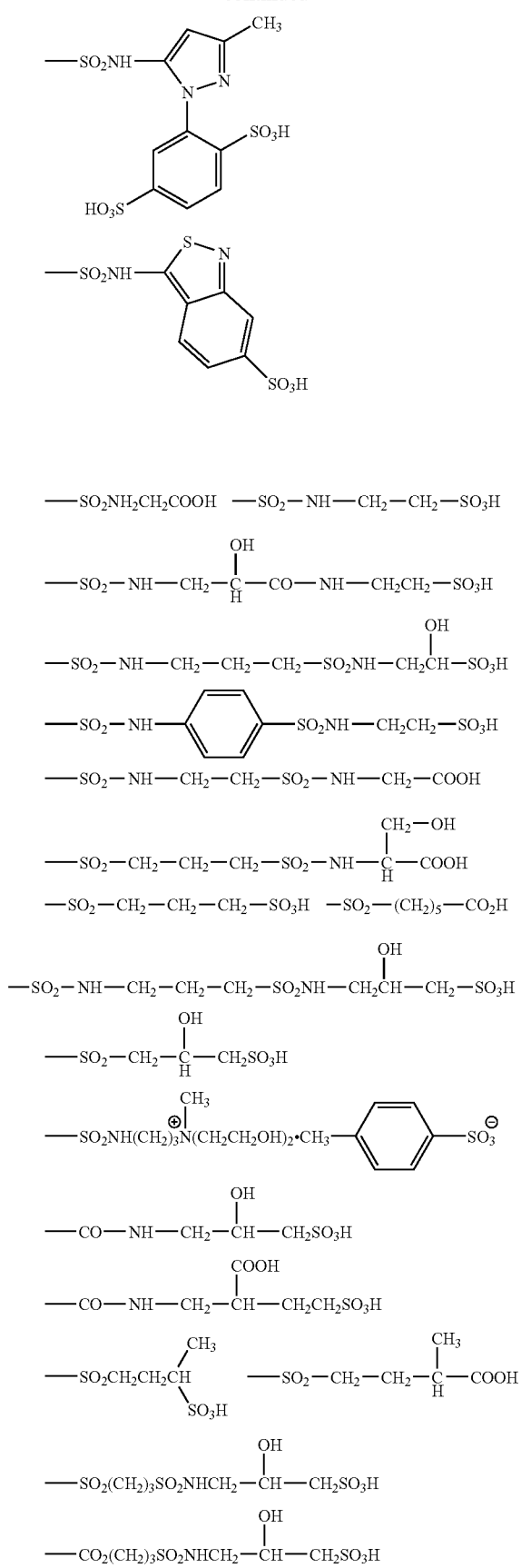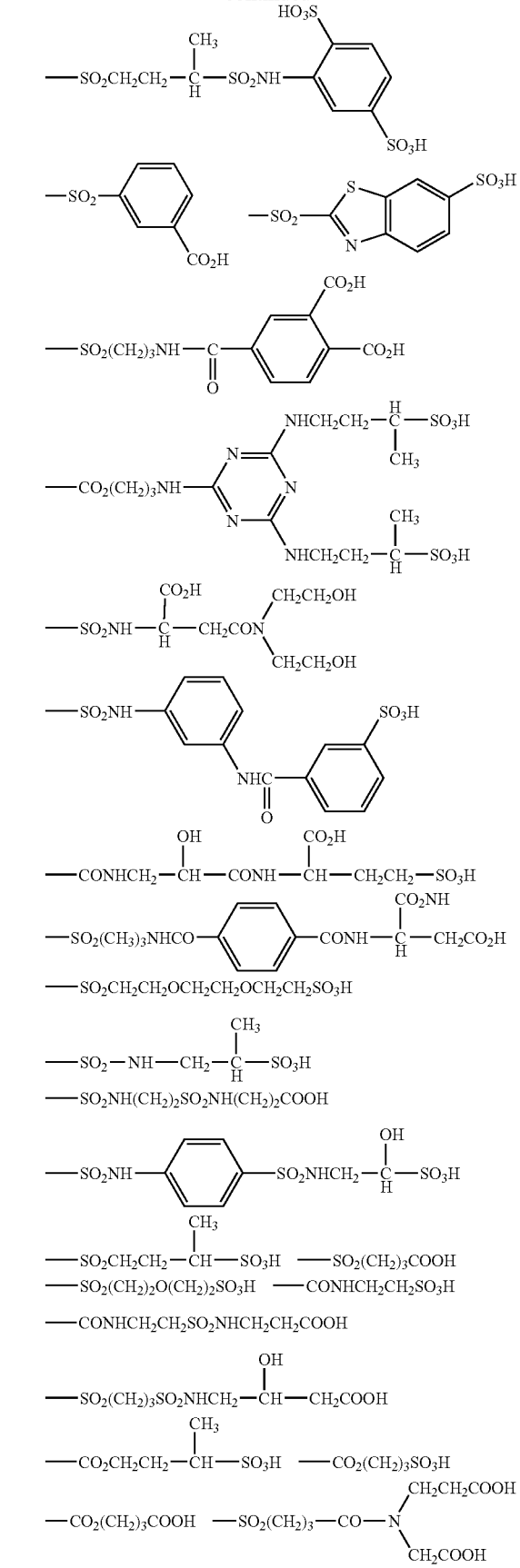

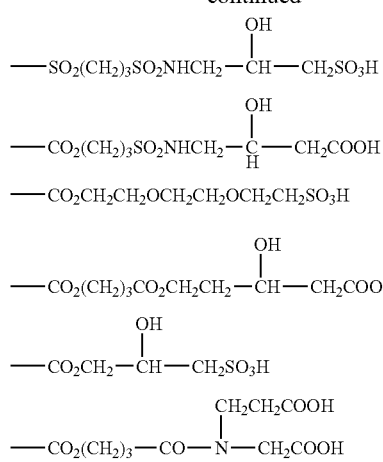
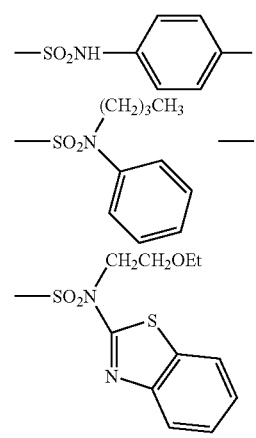
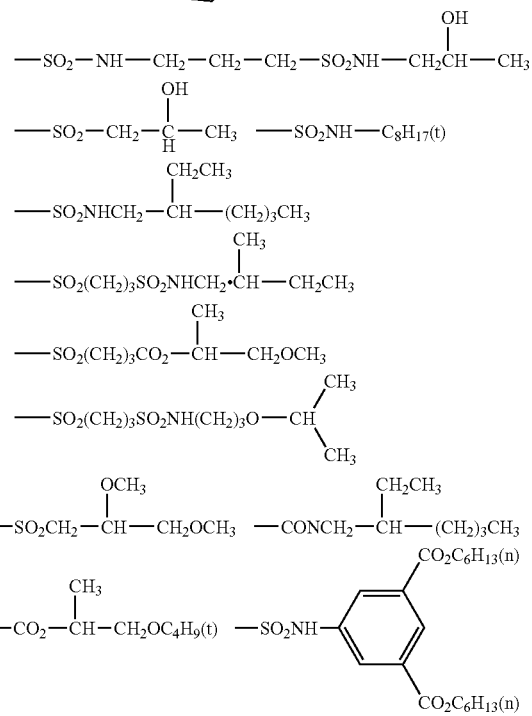
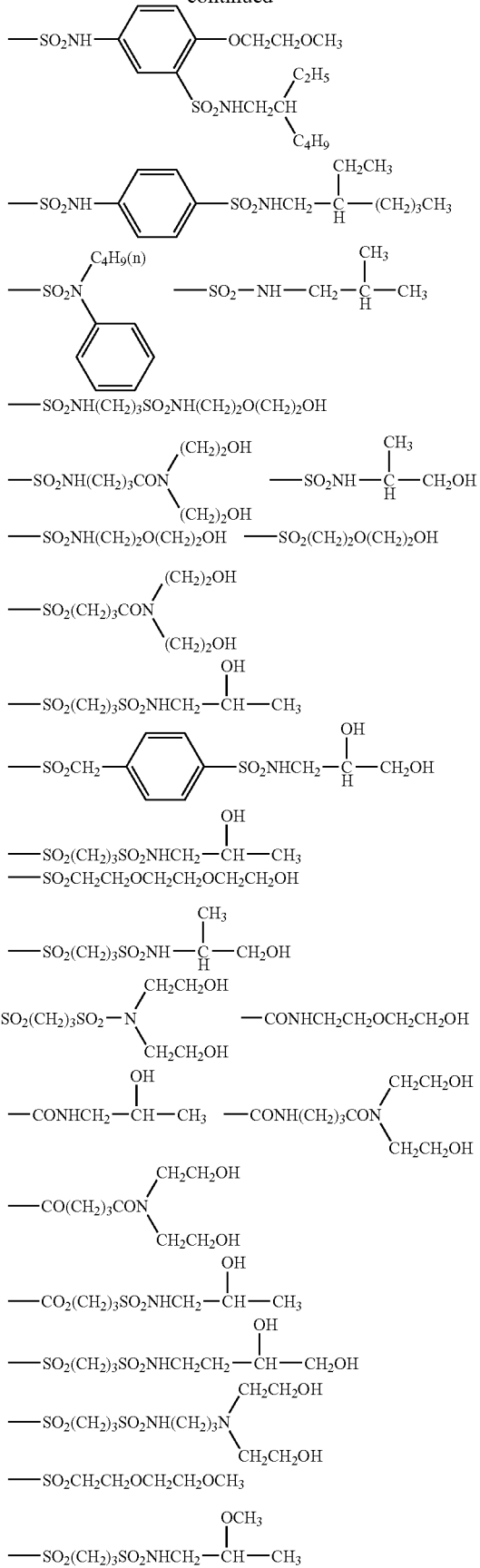
* Examples of Hydrogen-Bonding Groups:

-continued

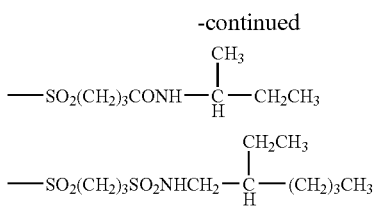

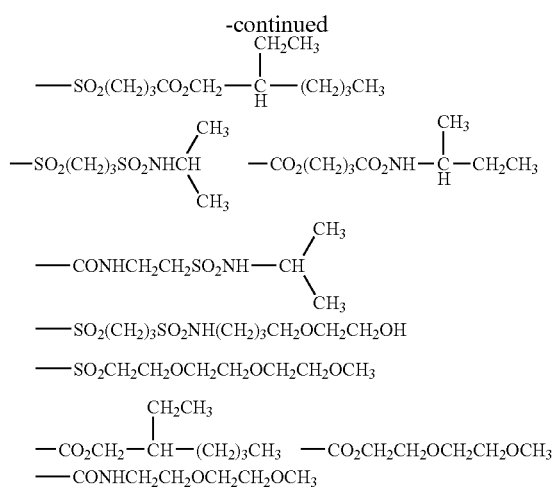

One or more water-soluble and hydrogen-bonding groups may be present respectively in a single molecule of dye (1), and water-soluble groups and/or the hydrogen-bonding groups different from each other may be blended in the molecule while the common structure of dye (1) is retained, and thus, it is possible to design various properties (ozone resistance, solubility, color tone, etc.) of the dye (1) and consequently of the ink composition, by selecting these groups properly.

The dyes represented by Formula (1) may be used alone or in combination with another dye, in particular another phthalocyanine dye. The dye according to the invention may be used as mixed with another phthalocyanine dye, but, during preparation of the dye represented by the Formula (1), an analogue compound having different or no substituent group Xp may be added to the phthalonitrile derivative (compound P) and the diiminoisoindoline derivative (compound Q) in preparing the phthalocyanine, for preparation of a mixture.

—Phthalocyanine Dye Represented by Formula (2)—

The associative dye (water-soluble phthalocyanine dye) is preferably a mixture of the phthalocyanine compounds represented by the following Formula (2) having at least one unsubstituted sulfamoyl group and at least one substituted sulfamoyl group having an ionic hydrophilic group.

Formula (2)

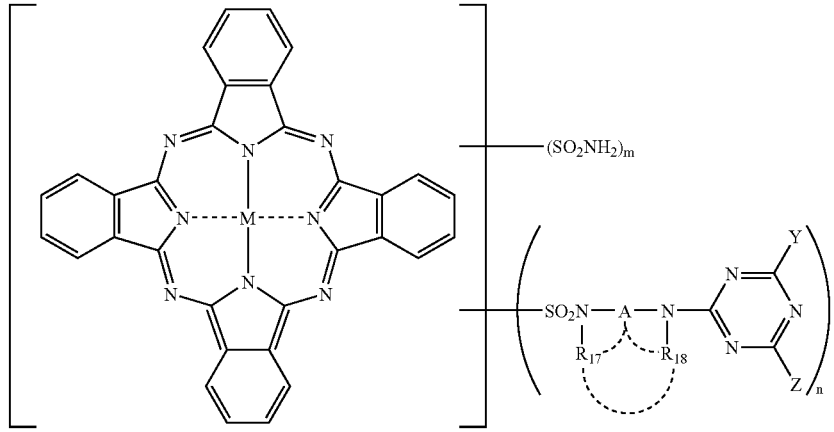

In Formula (2) above, M represents a hydrogen atom, a metal atom, a metal oxide, a metal hydroxide or a metal halide.

Typical examples of the metal atoms include, Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi and the like. Examples of the metal oxide include VO, GeO and the like. Examples of the metal hydroxides include $Si(OH)_2$, $Cr(OH)_2$, $Sn(OH)_2$, AlOH, and the like. Examples of the metal halides include $SiCl_2$, VCl, $VCl_2$, VOCl, FeCl, GaCl, ZrCl, AlCl, and the like. Among them, Cu, Ni, Zn, Al, and AlOH are preferably, and Cu is most preferable.

In Formula (2), $R_{17}$ and $R_{18}$ each independently represents a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heterocyclic group, or a substituted or unsubstituted alkenyl group.

Examples of the substituted or unsubstituted alkyl groups include alkyl groups having 1 to 12 carbon atoms. Examples of the substituent groups include a sulfonic acid group, a carboxyl group, a phosphoric acid group, a hydroxyl group, alkoxy groups, and amino groups (that may be substituted with alkyl, aryl or acetyl groups), aryl groups, halogen atoms, and a cyano group. Typical examples thereof include methyl, ethyl, propyl, butyl, pentyl, and hexyl groups, and the like.

Examples of the substituted or unsubstituted cycloalkyl groups include cycloalkyl groups having 1 to 12 carbon atoms. Examples of the substituent groups include a sulfonic acid group, a carboxyl group, a phosphoric acid group, a hydroxyl group, alkoxy groups, amino groups (that may be substituted with alkyl, aryl or acetyl groups), aryl groups, halogen atoms, and a cyano group. Typical examples thereof include a cyclohexyl group and the like.

Examples of the substituted or unsubstituted aralkyl groups include aralkyl groups having 1 to 12 carbon atoms.

Examples of the substituent groups include a sulfonic acid group, a carboxyl group, a phosphoric acid group, a hydroxyl group, alkoxy groups, amino groups (that may be substituted with alkyl, aryl or acetyl groups), aryl groups, halogen atoms, and a cyano group.

Examples of the substituted or unsubstituted aryl groups include phenyl and naphthyl groups. Examples of the substituent groups include a sulfonic acid group, a carboxyl group, a phosphoric acid group, a hydroxyl group, amino groups (that may be substituted with alkyl, aryl or acetyl groups), ureido groups, alkyl groups, alkoxy groups, a nitro group, a cyano group, heterocyclic groups, and halogen atoms.

Favorable examples of the substituted or unsubstituted heterocyclic group include five- or six-membered rings that may be additionally fused with another ring. The heterocyclic ring may be an aromatic or nonaromatic heterocyclic ring. Examples of the heterocyclic rings include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, pyrrolidine, piperidine, piperazine, imidazolidine, thiazoline, and the like. These heterocyclic rings may be substituted, and examples of the substituent groups include a sulfonic acid group, a carboxyl group, a phosphoric acid group, a hydroxyl group, amino groups (that may be substituted with alkyl, aryl or acetyl groups), ureido groups, alkyl groups, alkoxy groups, a nitro group, a cyano group, and halogen atoms.

Examples of the substituted or unsubstituted alkenyl groups include alkenyl groups having 1 to 12 carbon atoms. Examples of the substituent groups include a sulfonic acid group, a carboxyl group, a phosphoric acid group, a hydroxyl group, alkoxy groups, amino groups (that may be substituted with alkyl, aryl or acetyl groups), aryl groups, halogen atoms, and a cyano group.

In Formula (2), A represents a crosslinking group; and neighboring groups $R_{17}$ and $R_{18}$ and A may bind to each other, forming a ring.

Examples of the crosslinking groups include alkylene groups, cycloalkylene groups, and arylene groups; or the group may be a group in combination of these groups. An example of the combined group is xylylene. The group may form a crosslinking group with $R_{17}$ and $R_{18}$. In addition, the crosslinking group may be substituted. Examples of the substituent groups include a sulfonic acid group, a carboxyl group, and a hydroxyl group.

Examples of the alkylene groups include alkylene groups having 1 to 16 carbon atoms, and typical examples thereof include methylene, ethylene, propylene, butylene, pentylene, hexylene, and the like. Part of the alkylene carbon atoms may be substituted with a nitrogen, oxygen or sulfur atom. The alkylene may be a group formed in combination with a cycloalkylene group.

Examples of the cycloalkylene groups include cycloalkylene groups having 1 to 16 carbon atoms, and typical examples thereof include cyclohexylene and the like. Part of the cycloalkylene carbon atoms may be substituted with a nitrogen, oxygen or sulfur atom. The group may be a group formed in combination of cycloalkylene and alkylene groups. In addition, the cycloalkylene may be a bridged cyclic hydrocarbon or a spiro-cyclic hydrocarbon.

Examples of the arylene groups include phenylene, naphthylene, and the like, which may be substituted. Examples of the substituent groups include a sulfonic acid group, a carboxyl group, a phosphoric acid group, a hydroxyl group, amino groups (that may be substituted with alkyl, aryl or acetyl groups), ureido groups, alkyl groups, alkoxy groups, a nitro group, a cyano group, and halogen atoms.

In Formula (2), Y and Z each independently represents a halogen atom, a hydroxyl group, a sulfonic acid group, a carboxyl group, an amino group, a substituted or unsubstituted alkoxy group, a substituted or unsubstituted cycloalkyloxy group, a substituted or unsubstituted aryloxy group, a substituted or unsubstituted heterocyclic oxy group, a substituted or unsubstituted aralkyloxy group, a substituted or unsubstituted alkenyloxy group, a substituted or unsubstituted alkylamino group, a substituted or unsubstituted cycloalkylamino group, a substituted or unsubstituted arylamino group, a substituted or unsubstituted heterocyclic amino group, a substituted or unsubstituted aralkylamino group, a substituted or unsubstituted alkenylamino group, a substituted or unsubstituted dialkylamino group, a substituted or unsubstituted alkylthio group, a substituted or unsubstituted arylthio group, a substituted or unsubstituted heterocyclic thio group, a substituted or unsubstituted aralkylthio group, or a substituted or unsubstituted alkenylthio group; and at least one of Y and Z represents a group having a sulfonic acid group, a carboxyl group, or an ionic hydrophilic group.

The ionic hydrophilic group is preferably an anionic hydrophilic group, and examples thereof include sulfonic acid, carboxyl, phosphoric acid, and hydroxyl groups, and the like. The ionic hydrophilic group may be a free group, an alkali-metal, alkali-earth metal salt, or an onium ion or an ammonium salt of organic amine. Examples of the alkali metals include sodium, potassium, lithium, and the like. Examples of the alkali-earth metals include calcium, magnesium and the like. Examples of the organic amines include lower alkylamines having 1 to 4 carbon atoms such as methylamine and ethylamine; alkanol amines, mono-, di- or tri- (lower alkanol)amines having 1 to 4 carbon atoms, such as monoethanolamine, diethanolamine, triethanolamine, monoisopropanolamine, diisopropanolamine, triisopropanolamine; and the like. Preferably, it is a salt of ammonium, sodium, potassium, lithium, monoethanolamine, diethanolamine, trienolamine, monoisopropanol amine, diisopropanolamine, or triisopropanolamine.

Examples of the substituted or unsubstituted alkoxy groups include alkoxy groups having 1 to 12 carbon atoms. Examples of the substituent groups include a sulfonic acid group, a carboxyl group, a phosphoric acid group, a hydroxyl group, alkoxy groups, amino groups (that may be substituted with alkyl, aryl or acetyl groups), aryl groups, halogen atoms, and a cyano group. Among them, sulfonic acid, carboxyl, phosphoric acid, and hydroxyl groups are preferable.

Examples of the substituted or unsubstituted cycloalkyloxy groups include cycloalkyloxy groups having 1 to 12 carbon atoms. Examples of the substituent groups include a sulfonic acid group, a carboxyl group, a phosphoric acid group, a hydroxyl group, alkoxy groups, amino groups (that may be substituted with alkyl, aryl or acetyl groups), aryl groups, halogen atoms, and a cyano group. Among them, sulfonic acid, carboxyl, phosphoric acid, and hydroxyl groups are preferable.

Examples of the substituted or unsubstituted aryloxy groups include phenoxy and naphthoxy groups. Examples of the substituent groups include a sulfonic acid group, a carboxyl group, a phosphoric acid group, a hydroxyl group, amino groups (that may be substituted with alkyl, aryl or acetyl groups), ureido groups, alkyl groups, alkoxy groups, a nitro group, a cyano group, heterocyclic groups, and halogen atoms. Among them, sulfonic acid, carboxyl, phosphoric acid, and hydroxyl groups are preferable.

The substituted or unsubstituted heterocyclic oxy group is preferably a five- or six-membered ring that may be fused with another ring. In addition, it may be an aromatic or non-aromatic heterocyclic ring. Examples of the heterocyclic rings include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, pyrrolidine, piperidine, piperazine, imidazolidine, thiazoline, and the like. The heterocyclic ring may be substitute, and examples of the substituent groups include a sulfonic acid group, a carboxyl group, a phosphoric acid group, a hydroxyl group, amino groups (that may be substituted with alkyl, aryl or acetyl groups), ureido groups, alkyl groups, alkoxy groups, a nitro group, a cyano group, and halogen atoms.

Examples of the substituted or unsubstituted aralkyloxy groups include aralkyloxy groups having 1 to 12 carbon atoms. Examples of the substituent groups include a sulfonic acid group, a carboxyl group, a phosphoric acid group, a hydroxyl group, amino groups (that may be substituted with alkyl, aryl or acetyl groups), ureido groups, alkyl groups, alkoxy groups, a nitro group, a cyano group, heterocyclic groups, and halogen atoms. Among them, sulfonic acid, carboxyl, phosphoric acid, and hydroxyl groups are preferable.

Examples of the substituted or unsubstituted alkenyloxy groups include alkenyloxy groups having 1 to 12 carbon atoms. Examples of the substituent groups include a sulfonic acid group, a carboxyl group, a phosphoric acid group, a hydroxyl group, alkoxy groups, amino groups (that may be substituted with alkyl, aryl or acetyl groups), aryl groups, halogen atoms, and a cyano group. Among them, sulfonic acid, carboxyl, phosphoric acid, and hydroxyl groups are preferable.

Examples of the substituted or unsubstituted alkylamino groups include alkylamino groups having 1 to 12 carbon atoms. Examples of the substituent groups include a sulfonic acid group, a carboxyl group, a phosphoric acid group, a hydroxyl group, alkoxy groups, amino groups (that may be substituted with alkyl, aryl or acetyl groups), aryl groups, halogen atoms, and a cyano group. Among them, sulfonic acid, carboxyl, phosphoric acid, and hydroxyl groups are preferable.

Examples of the substituted or unsubstituted cycloalkylamino groups include cycloalkylamino groups having 1 to 12 carbon atoms. Examples of the substituent groups include a sulfonic acid group, a carboxyl group, a phosphoric acid group, a hydroxyl group, alkoxy groups, amino groups (that may be substituted with alkyl, aryl or acetyl groups), aryl groups, halogen atoms, and a cyano group. Among them, sulfonic acid, carboxyl, phosphoric acid, and hydroxyl groups are preferable.

Examples of the substituted or unsubstituted arylamino groups include anilino and naphthylamino groups. Examples of the substituent groups include a sulfonic acid group, a carboxyl group, a phosphoric acid group, a hydroxyl group, amino groups (that may be substituted with alkyl, aryl or acetyl groups), ureido groups, alkyl groups, alkoxy groups, a nitro group, a cyano group, heterocyclic groups, and halogen atoms. Among them, sulfonic acid, carboxyl, phosphoric acid, and hydroxyl groups are preferable.

The substituted or unsubstituted heterocyclic amino group is preferably a five- or six-membered ring that may be additionally fused with another ring. In addition, it may be an aromatic or nonaromatic heterocyclic ring. Examples of the heterocyclic rings include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, pyrrolidine, piperidine, piperazine, imidazolidine, thiazoline, and the like. The heterocyclic ring may be substitute, and examples of the substituent groups include a sulfonic acid group, a carboxyl group, a phosphoric acid group, a hydroxyl group, amino groups (that may be substituted with alkyl, aryl or acetyl groups), ureido groups, alkyl groups, alkoxy groups, a nitro group, a cyano group, and halogen atoms.

Examples of the substituted or unsubstituted aralkylamino groups include aralkylamino groups having 1 to 12 carbon atoms. Examples of the substituent groups include a sulfonic acid group, a carboxyl group, a phosphoric acid group, a hydroxyl group, amino groups (that may be substituted with alkyl, aryl or acetyl groups), ureido groups, alkyl groups, alkoxy groups, a nitro group, a cyano group, heterocyclic groups, and halogen atoms. Among them, sulfonic acid, carboxyl, phosphoric acid, and hydroxyl groups are preferable.

Examples of the substituted or unsubstituted alkenylamino groups include alkenylamino groups having 1 to 12 carbon atoms. Examples of the substituent groups include a sulfonic acid group, a carboxyl group, a phosphoric acid group, a hydroxyl group, alkoxy groups, amino groups (that may be substituted with alkyl, aryl or acetyl groups), aryl groups, halogen atoms, and a cyano group. Among them, sulfonic acid, carboxyl, phosphoric acid, and hydroxyl groups are preferable.

Examples of the substituted or unsubstituted alkylthio groups include alkylthio groups having 1 to 12 carbon atoms. Examples of the substituent groups include a sulfonic acid group, a carboxyl group, a phosphoric acid group, a hydroxyl group, alkoxy groups, amino groups (that may be substituted with alkyl, aryl or acetyl groups), aryl groups, halogen atoms, and a cyano group. Among them, sulfonic acid, carboxyl, phosphoric acid, and hydroxyl groups are preferable.

Examples of the substituted or unsubstituted arylthio groups include phenylthio and naphthylthio groups. Examples of the substituent groups include a sulfonic acid group, a carboxyl group, a phosphoric acid group, a hydroxyl group, amino groups (that may be substituted with alkyl, aryl or acetyl groups), ureido groups, alkyl groups, alkoxy groups, a nitro group, a cyano group, heterocyclic groups, and halogen atoms. Among them, sulfonic acid, carboxyl, phosphoric acid, and hydroxyl groups are preferable.

The substituted or unsubstituted heterocyclic thio group is preferably a five- or six-membered ring that may be fused additionally with another ring. In addition, it may be an aromatic or nonaromatic heterocyclic ring. Examples of the heterocyclic rings include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, pyrrolidine, piperidine, piperazine, imidazolidine, thiazoline, and the like. The heterocyclic ring may be substitute, and examples of the substituent groups include a sulfonic acid group, a carboxyl group, a phosphoric acid group, a hydroxyl group, amino groups (that may be substituted with alkyl, aryl or acetyl groups), ureido groups, alkyl groups, alkoxy groups, a nitro group, a cyano group, and halogen atom.

Examples of the substituted or unsubstituted aralkylthio groups include aralkylthio groups having 1 to 12 carbon atoms. Examples of the substituent groups include a sulfonic acid group, a carboxyl group, a phosphoric acid group, a hydroxyl group, amino groups (that may be substituted with alkyl, aryl or acetyl groups), ureido groups, alkyl groups, alkoxy groups, a nitro group, a cyano group, heterocyclic groups, and halogen atoms. Among them, sulfonic acid, carboxyl, phosphoric acid, and hydroxyl groups are preferable.

Examples of the substituted or unsubstituted alkenylthio groups include alkenylthio group having 1 to 12 carbon atoms. Examples of the substituent groups include a sulfonic acid group, a carboxyl group, a phosphoric acid group, a hydroxyl group, alkoxy groups, amino groups (that may be substituted with alkyl, aryl or acetyl groups), aryl groups, halogen atoms, and a cyano group. Among them, sulfonic acid, carboxyl, phosphoric acid, and hydroxyl groups are preferable.

In Formula (2), the number of unsubstituted sulfamoyl groups m and the number of substituted sulfamoyl groups n each independently are 1 to 3, and the sum of m and n is 2 to 4.

Particularly preferably in the phthalocyanine dye represented by Formula (2), M is Cu, Ni, Zn, Al, or AlOH (in particular, Cu); $R_{17}$ represents a hydrogen atom or a methyl or ethyl group (in particular, a hydrogen atom); $R_{18}$ represents a hydrogen atom or a methyl or ethyl group (in particular, a hydrogen atom); A represents an alkylene group having 1 to 5 carbon atoms (in particular, ethylene); Y and Z each independently represents a sulfonic acid group or a phenyl group substituted with sulfonic acid groups; and the sum of m and n is 2 to 4.

Increased ratio in the number of unsubstituted sulfamoyl groups m in Formula (2) above leads to improvement in ozone resistance, but also to deterioration in water-soluble, making ink preparation more difficult. On the other hand, increased ratio in the number of the substituted sulfamoyl groups n in Formula (2) leads to increase in water-solubility and reduction of bronzing phenomenon, but also to deterioration in ozone resistance. Thus, it is preferable to select a well-balanced rate, by properly adjusting the rate of the unsubstituted sulfamoyl groups to the substituted sulfamoyl groups according to the type of the substituted sulfamoyl group.

Hereinafter, typical examples of the combinations of M and substituted sulfamoyl group in the mixture of the phthalocyanine compounds represented by Formula (2) above will be listed (Exemplary compound Nos. 1 to 47). However, the phthalocyanine compound mixtures for use in the invention are not limited to these examples. In the typical examples, the substituted sulfamoyl group is shown in the free acid form.

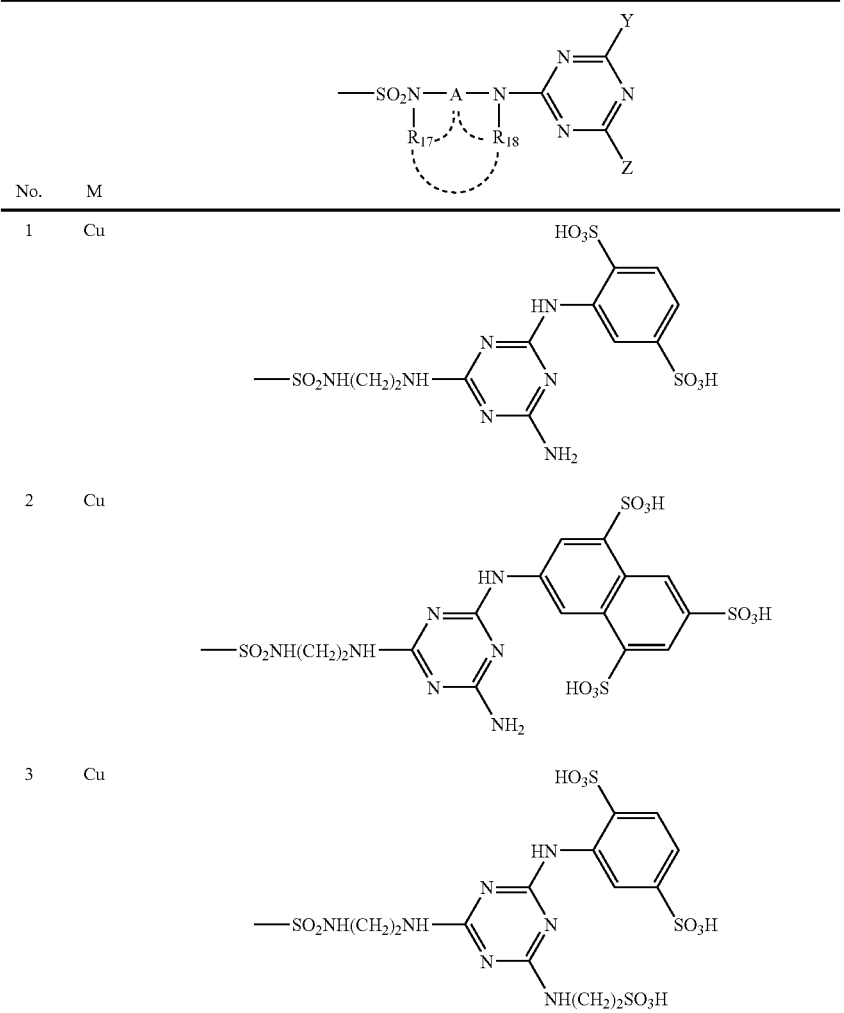

-continued
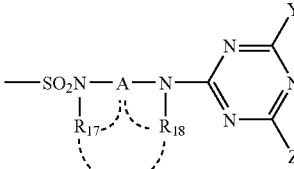
| No. | M |
|---|---|
| 4 | Cu |
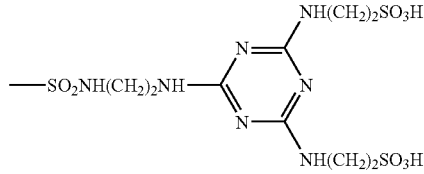
| 5 | Cu |
|---|---|
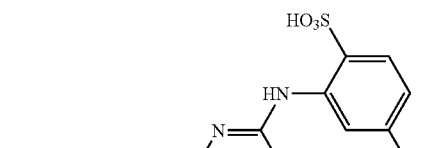
| 6 | Cu |
|---|---|
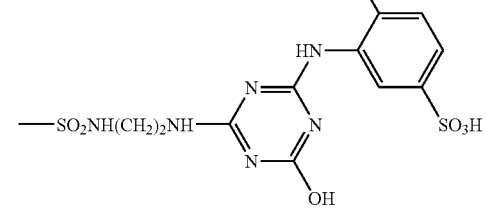
| 7 | Cu |
|---|---|
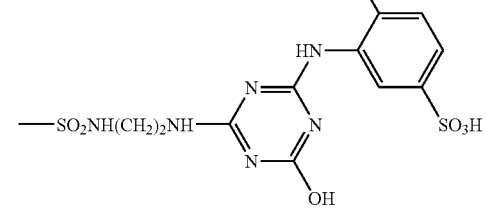
| 8 | Cu |
|---|---|
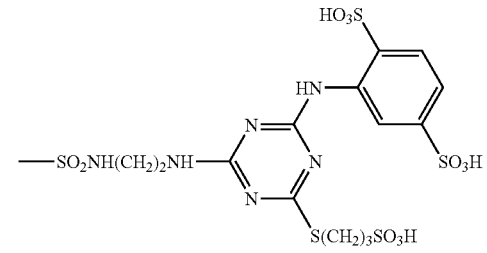
| 9 | Cu |
|---|---|
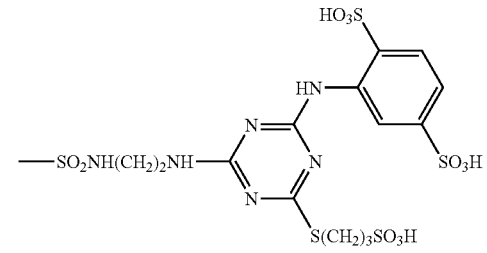

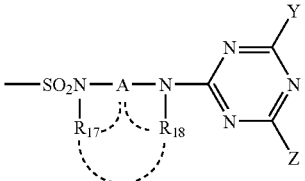

-continued
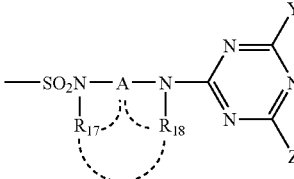
| No. | M |
|---|---|
| 15 | Cu |
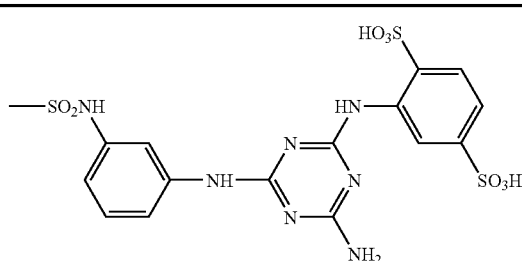
| 16 | Cu |
|---|---|
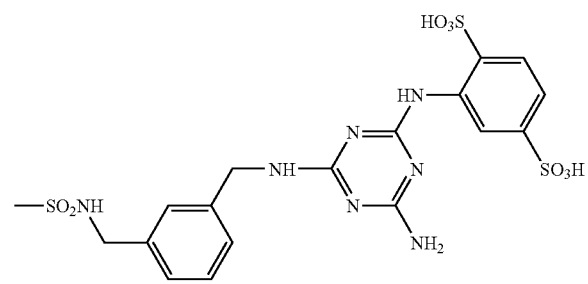
| 17 | Cu |
|---|---|
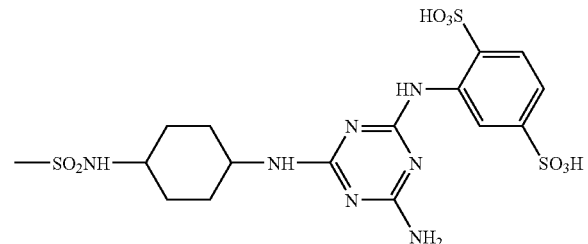
| 18 | Cu |
|---|---|
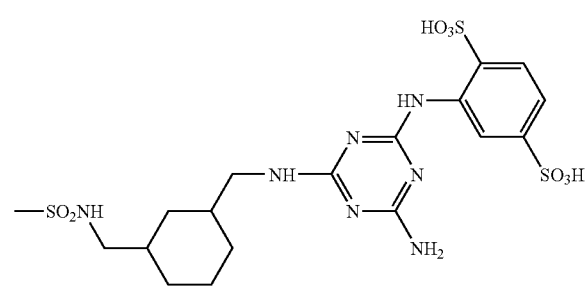
| 19 | Cu |
|---|---|
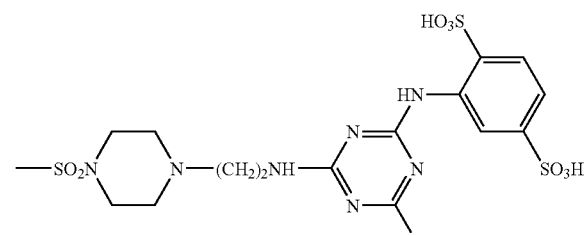

-continued
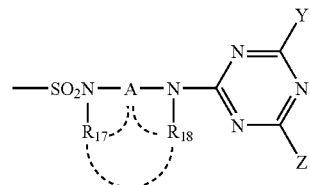
| No. | M | |
|---|---|---|
| 20 | Cu | 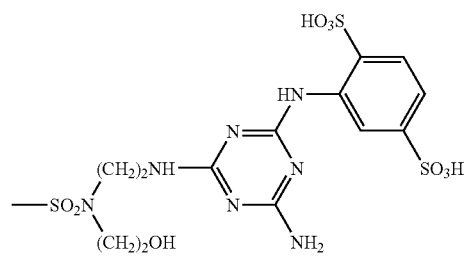 |
| 21 | Cu | 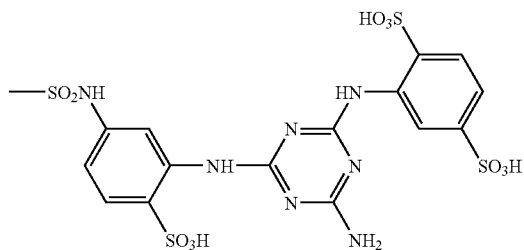 |
| 22 | Cu | 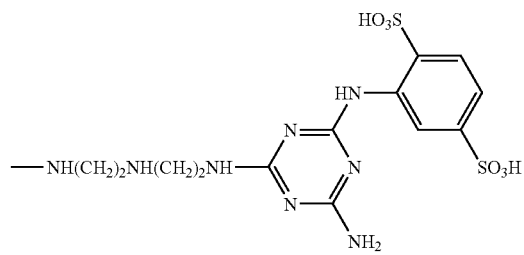 |
| 23 | Cu | 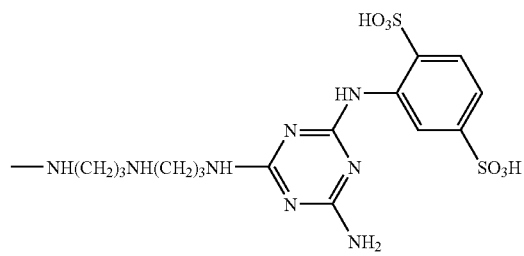 |
| 24 | Cu | 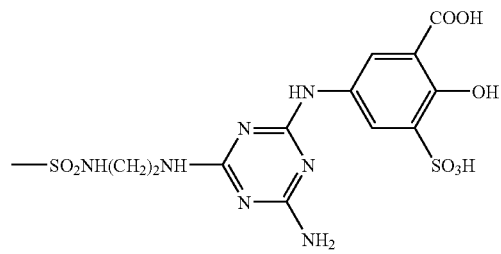 |

-continued
| | | |
|---|---|---|
| | 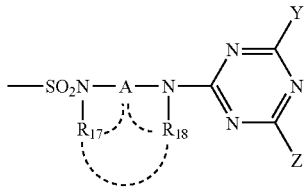 | |
| No. | M | |
| 25 | Cu | 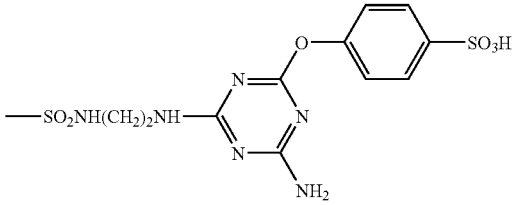 |
| 26 | Cu | 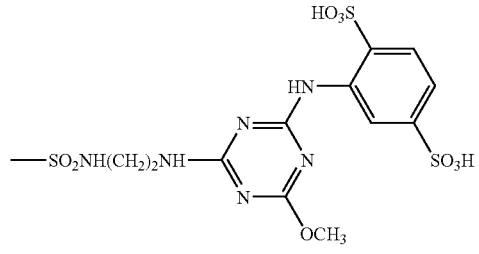 |
| 27 | Cu | 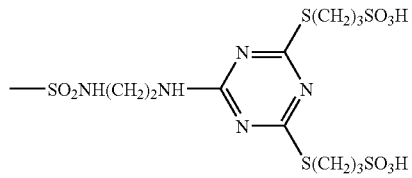 |
| 28 | Cu | 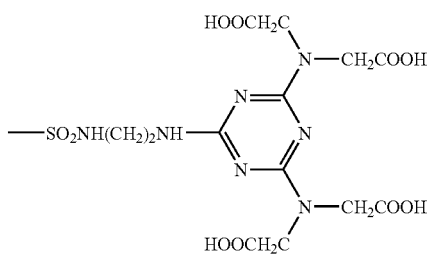 |
| 29 | Cu | 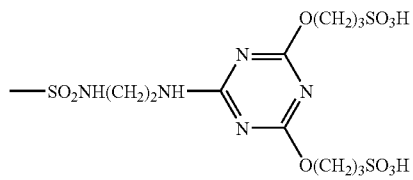 |
| 30 | Cu | 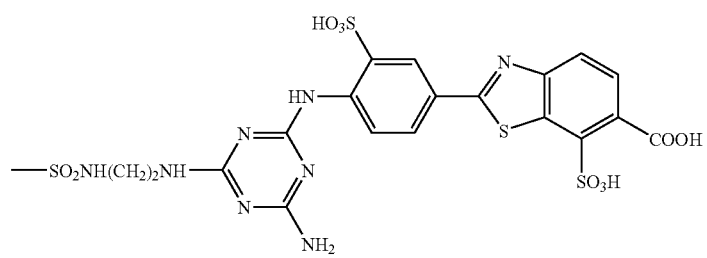 |

-continued
| No. | M | |
|---|---|---|
| | | 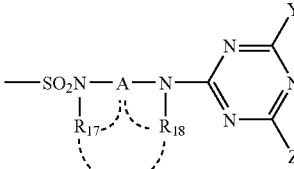 |
| 31 | Cu | 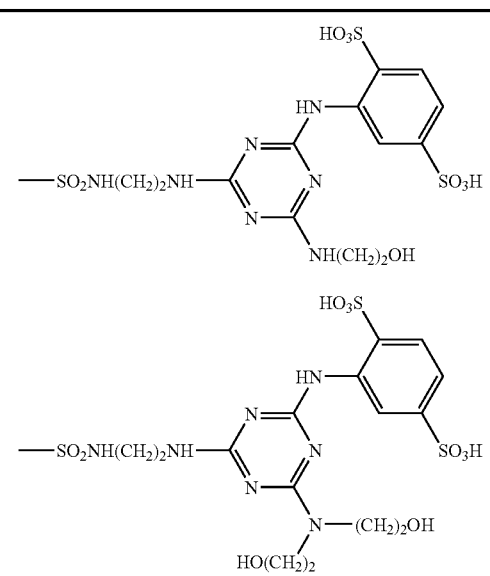 |
| 32 | Cu | |
| 33 | Cu | 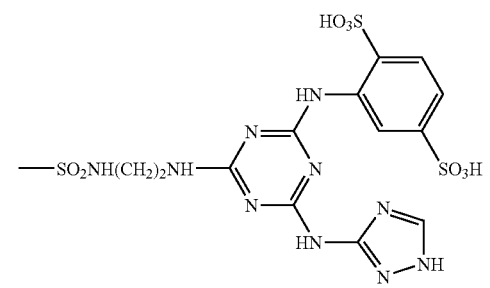 |
| 34 | Cu | 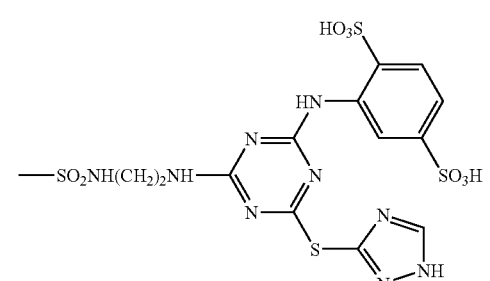 |
| 35 | Cu | 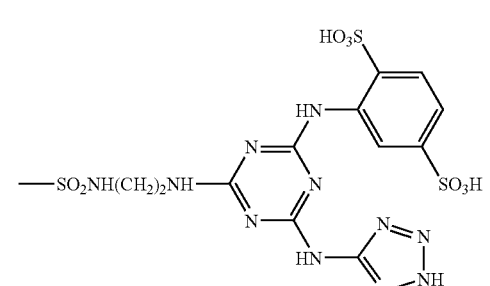 |

-continued

| No. | M | -A-N(R18)-triazine with Y and Z) |
|-----|---|---|
| 36 | Cu | —SO₂NH(CH₂)₂NH— triazine substituted with HN-phenyl(SO₃H, SO₃H) and HN-pyrimidine-2,4-dione |
| 37 | Cu | —SO₂NH(CH₂)₂NH— triazine substituted with HN-phenyl(SO₃H, SO₃H) and HN-glucosamine (sugar with OH, OH, OH, CH₂OH) |
| 38 | Cu | —SO₂NH(CH₂)₂NH— triazine with two N(CH₃)(CH₂)₂SO₃H groups |
| 39 | Cu | —SO₂NH(CH₂)₂NH— triazine with HN-phenyl(COOH, COOH) and NH(CH₂)₂SO₃H |
| 40 | Cu | —SO₂NH(CH₂)₂NH— triazine with two SO₃H groups |

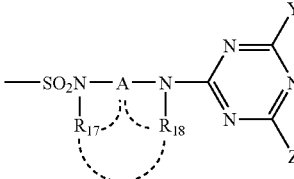
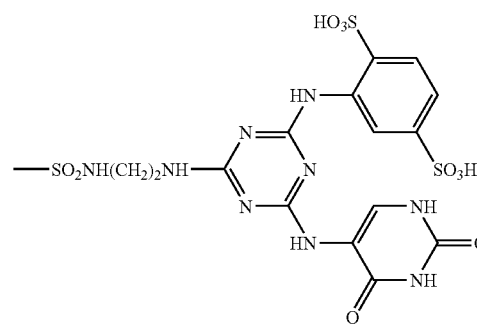
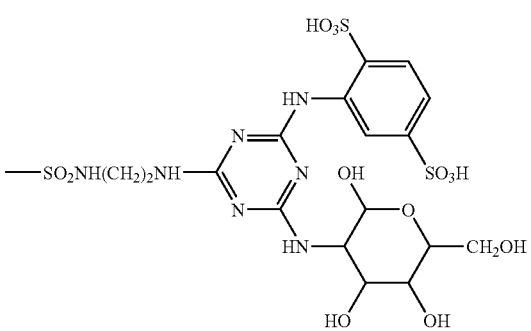
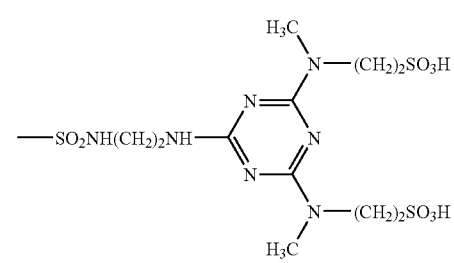
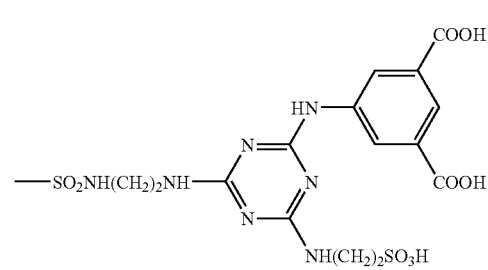
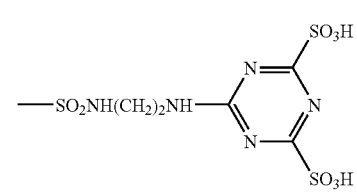

-continued

[Structure: —SO₂N(R₁₇)—A—N(R₁₈)—(triazine with Y and Z substituents)]

| No. | M |
|---|---|
| 41 | Cu |

—SO₂NH(CH₂)₂NH—(triazine with COOH, COOH)

| 42 | Ni |

—SO₂NH(CH₂)₂NH—(triazine with NH-phenyl(2-SO₃H, 5-SO₃H), NH₂)

| 43 | Ni |

—SO₂NH(CH₂)₂NH—(triazine with NH(CH₂)₂SO₃H, NH(CH₂)₂SO₃H)

| 44 | Zn |

—SO₂NH(CH₂)₂NH—(triazine with NH-phenyl(2-SO₃H, 5-SO₃H), NH₂)

| 45 | Zn |

—SO₂NH(CH₂)₂NH—(triazine with NH(CH₂)₂SO₃H, NH(CH₂)₂SO₃H)

| 46 | AlOH |

—SO₂NH(CH₂)₂NH—(triazine with NH-phenyl(2-SO₃H, 5-SO₃H), NH₂)

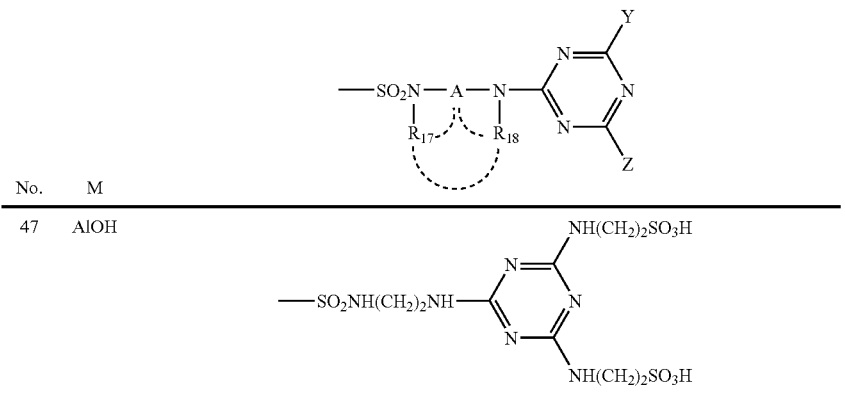

| No. | M |
|---|---|
| 47 | AlOH |

Among the associative dyes (water-soluble phthalocyanine dyes) above, particularly preferable is at least one compound selected from the compounds represented by Formula (1) and the salts thereof.

The content of the water-soluble phthalocyanine dye in water-soluble ink is properly selected according to the concentration and properties of the ink, however preferably 0.01 mass % or more, more preferably, 0.1 to 20 mass %, with respect to the total mass of the ink.

The water-soluble ink according to the invention may contain a solvent, in particular a water-miscible organic solvent. The solvent is a material having functions, for example, as an anti-drying agent, a penetration-accelerating agent, and a wetting agent; and mainly a high-boiling point water-miscible organic solvent is used. Typical examples of such compounds are described in JP-A No. 2004-331871, paragraphs [0419] to [0423].

In the invention, among the water-miscible organic solvents, particularly preferably are alcoholic solvents. The water-soluble ink according to the invention preferably contains a water-miscible organic solvent having a boiling point of 150° C. or higher.

The total content of these water-miscible organic solvents in the water-soluble ink is preferably 5 to 60 mass %, particularly preferably 10 to 45 mass %.

For the purpose of improving the ink-ejection stability, printing quality, image durability, and others of the water-soluble ink according to the invention, additives, for example described in JP-A No. 2004-331871, such as surfactant, anti-drying agent, penetration-accelerating agent, urea-based additive, chelating agent, ultraviolet absorbent, antioxidant, viscosity adjustor, surface tension adjustor, dispersant, dispersion stabilizer, antiseptic, fungicide, antirust, pH adjuster, antifoaming agent, polymer material, and acid precursor, may be added as properly selected. The favorable amounts of these additives used are described in JP-A No. 2004-331871 and others.

—Anti-Bronzing Agents—

An anti-bronzing agent may be used for reducing or eliminating the bronzing phenomenon observed when a solid image is printed using an ink set containing a black ink composition.

An anti-bronzing agent for use in the invention has a function to reducing or eliminating the bronzing phenomenon observed when a solid image is printed using an ink set containing a black ink composition, and examples of anti-bronzing agents include carboxyl group-containing aromatic compounds or the salts thereof.

The "carboxyl group-containing aromatic compound or the salt thereof" for use in the invention is not particularly limited, if it is an aromatic compound having at least one carboxyl group in the molecular structure or the salt thereof, however the number of the carboxyl groups is preferably 1, and that having a naphthalene skeleton is preferable. A compound having carboxyl groups and —OR groups (R is a hydrogen atom or an alkyl group having 1 to 6 carbon atoms) on a naphthalene skeleton is also preferable, and the numbers of the carboxyl groups and the —OR groups in the naphthalene skeleton-containing compound or the salt thereof are respectively, preferably 1. A compound having a naphthalene skeleton containing a carboxyl group at the 2-position or the salt thereof is more preferable, and an example thereof is an alkali-metal salt of a compound having a naphthalene skeleton containing a carboxyl group at the 2-position. Among the alkali-metal salts of the compound having a naphthalene skeleton containing a carboxyl group at the 2-position, a lithium salt is particularly preferable for improvement in bronzing resistance and also in clogging resistance.

Typical examples of the carboxyl group-containing aromatic compounds or the salts thereof include 2-hydroxy-1-naphthoic acid, 1-hydroxy-2-naphthoic acid, 1-naphthoic acid, 2-naphthoic acid, 3-hydroxy-2-naphthoic acid, 6-hydroxy-2-naphthoic acid, 3-methoxy-2-naphthoic acid, 6-methoxy-2-naphthoic acid, 6-ethoxy-2-naphthoic acid, 6-propoxy-2-naphthoic acid, 4-hydroxybenzoic acid, 2,6-naphthalenedicarboxylic acid, and the like, and the salts thereof (in particular, lithium salts); and these compounds may be used alone or in combination of two or more.

The carboxyl group-containing aromatic compound may be added in the form of salt to a black ink composition, or the carboxyl group-containing aromatic compound and a base may be added separately to and contained in a black ink composition.

The total amount of these carboxyl group-containing aromatic compounds and/or the salts thereof is decided properly according to the types of the carboxyl group-containing aromatic compounds and/or the salts thereof, the dye, and the solvent component used.

The other anti-bronzing agent is preferably a colorless water-soluble flat-plate-shaped compound having more than ten unlocalized π electrons in the molecule. The water-soluble flat-plate-shaped compound may be used, as selected from the compounds described in JP-A No. 2005-105261, paragraphs [0012] to [0026].

The content of the anti-bronzing agent is preferably 0.1 to 10 mass %, more preferably in the range of 0.5 to 5 mass %, with respect to the total weight of the black ink composition.

—Ozone-Resistance Improver—

The ozone-resistance improver is a compound having a function to inhibit oxidation of dye, and examples thereof include thiol-based compounds, amidine-based compounds, carbazide-based compounds, hydrazide-based compounds, guanidine-based compounds, and the like.

(Thiol-Based Compound)

The thiol-based compound for use in the invention is a SH group-containing compound, preferably an aromatic or aliphatic thiol-based compound, and preferably a compound represented by the following (B).

$$R_{10}\text{—SH} \quad \text{Formula (B):}$$

(Wherein, $R_{10}$ represents an alkyl, aryl, or heterocyclic group).

$R_{10}$ will be described below.

The alkyl group is preferably a group having 1 to 12 carbon atoms, more preferably having 1 to 6 carbon atoms.

The aryl group is preferably a group having 6 to 18 carbon atoms, more preferably having 6 to 10 carbon atoms.

Examples of the heterocyclic groups include furyl, pyridyl, pyrimidyl, pyrrolyl, pyrrolinyl, pyrrolidyl, dioxolyl, pyrazolyl, pyrazolinyl, pyrazolidyl, imidazolyl, oxazolyl, thiazolyl, oxadiazolyl, triazolyl, thiadiazolyl, pyryl, pyridyl, pyperidyl, dioxanyl, morpholyl, pyridazyl, pyrazyl, piperazyl, triazyl, and trithianyl groups, and the like.

As described above, the substituent groups represented by $R_{10}$ include the groups above of which the hydrogen atoms are substituted with any other substituent groups. Examples of the substituent groups include a carboxyl group, an oxo group, an amino group, amino acid residues (preferably having 2 to 8 carbon atoms), an ammonium group, a hydroxyl group, a thiol group, alkoxy groups (preferably having 1 to 12 carbon atoms), acylamino groups (preferably having 1 to 12 carbon atoms wherein the carboxyl, amino, or other group thereof may be substituted), carbamoyl groups, and the like; and two or more substituent groups may be present on the same molecule.

In preparation of the compound represented by Formula (B), a thiol having R as the aryl group is obtained in reaction of the corresponding aryl Grignard reagent and pure sulfur, or a thiol having $R_{10}$ as its alkyl group is prepared in reaction of the corresponding alkyl halide and a sodium hydrogen sulfide or thiourea.

—Amidine-Based Compound—

The amidine-based compound for use in the invention is a compound having a structure in which a —C(=NH)—NH$_2$ group (amidino group) is bound to the carbon atom of a carbon-containing group, and one or more hydrogen atoms of the —C(=NH)—NH$_2$ group may be substituted with substituent groups.

The amidine-based compounds are preferably those represented by the following Formula (C).

Formula (C):

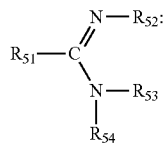

In Formula (C), $R_{51}$, $R_{52}$, $R_{53}$, and $R_{54}$ each independently represents a hydrogen atom or an alkyl, aryl, or heterocyclic group; and, when $R_{51}$ contains a nitrogen atom, the nitrogen atom is not bound to C shown in the Formula.

The alkyl group is preferably a group having 1 to 12 carbon atoms, more preferably a group having 1 to 6 carbon atoms.

The aryl group is preferably a group having 6 to 18 carbon atoms, more preferably a group having 6 to 10 carbon atoms.

Examples of the heterocyclic groups include furyl, pyridyl, pyrimidyl, pyrrolyl, pyrrolinyl, pyrrolidyl, dioxolyl, pyrazolyl, pyrazolinyl, pyrazolidyl, imidazolyl, oxazolyl, thiazolyl, oxadiazolyl, triazolyl, thiadiazolyl, pyryl, pyridyl, pyperidyl, dioxanyl, morpholyl, pyridazyl, pyrazyl, piperazyl, triazyl, and trithianyl groups, and the like.

The hydrogen atoms of the groups represented by $R_{51}$ to $R_{54}$ may be substituted with any other substituent groups. Examples of the substituent groups include halogen atoms such as chlorine, a nitro group, an amino group, a carboxyl group, a carbamoyl group, an amidino group, aryloxy groups (the aryl group therein my be substituted additionally with the substituent groups listed here), and the like; and two or more substituent groups may be substituted on a single molecule. The hydrogen atoms of the amino, carbamoyl, and amidino groups may be substituted with the alkyl, aryl, or heterocyclic group represented by $R_{51}$ to $R_{54}$.

The amidine-based compound may be present in the form of salt such as hydrochloride salt.

The compound represented by Formula (C) may be prepared, for example, at least in the step of allowing ammonia to react with the hydrochloride salt of the corresponding imino ether.

<Carbazide-Based Compound>

The carbazide-based compound for use in the invention means a carbazide or the derivative thereof, preferably a compound represented by Formula (D):

$$R_{55}R_{56}\text{NCONHNR}_{57}R_{58}$$

($R_{55}$ to $R_{58}$ each independently represents a hydrogen atom or an organic group).

The organic groups are preferably those described for $R_{51}$ to $R_{54}$. The groups represented by $R_{55}$ to $R_{58}$ include the groups above of which the hydrogen atoms are substituted with any other substituent groups. Favorable examples of the substituent groups include those exemplified above as the substituents for $R_{51}$ to $R_{54}$ and also —HNCONHNR$_{59}$R$_{60}$ (wherein $R_{59}$ and $R_{60}$ are organic group; and favorable examples thereof are the same as those for $R_{51}$ to $R_{54}$). In the invention, the structure —HNCONHNR$_{59}$R$_{60}$ is called carbazide structure. The carbazide-based compound favorably used in the invention has two or more carbazide structures (more preferably 2 to 6) in the same molecule.

The carbazide-based compound represented by Formula (D) is prepared specifically, for example, in condensation reaction of the corresponding isocyanate, diisocyanate, urea derivative, or the like with a hydrazine compound represented by NH$_2$NR$_{57}$R$_{58}$ ($R_{57}$ and $R_{58}$ are the same as those described above).

<Hydrazide-Based Compound>

The hydrazide-based compound for use in the invention means hydrazide or the derivative thereof, preferably a compound represented by Formula (E):

$$R_{61}\text{CONHNR}_{62}R_{63}$$

($R_{61}$ to $R_{63}$ each independently represent a hydrogen atom or a hydrazino or organic group, and $R_{61}$ may bind to $R_{62}$ or $R_{63}$, forming a ring).

The organic groups are preferably those described above for $R_{51}$ to $R_{54}$ in Formula (C) represented by Formula (C). The groups represented by $R_{61}$ to $R_{63}$ include the groups above of which the hydrogen atoms are substituted with any other substituent groups. Favorable examples of the substituent groups include the substituents exemplified above for $R_{51}$ to $R_{54}$ and also acyl groups, a cyano group, alkoxy groups, aralkyloxy groups, a benzoyl group, —$CONHR_{64}R_{65}$ (wherein, $R_{64}$ and $R_{65}$ are organic groups; and the favorable examples thereof are the same as those for $R_{51}$ to $R_{54}$). In the invention, the structure —$CONHNR_{14}R_{15}$ is called hydrazide structure. The hydrazide-based compound for use in the invention preferably has two or more hydrazide structures (more preferably 2 to 6) in the same molecule.

The hydrazide-based compound represented by Formula (E) is prepared specifically, for example, in condensation reaction of the acid derivative, such as ester or acid halide of the corresponding carboxylic acid with a hydrazide-based compound represented by Formula $NH_2NR_{62}R_{63}$ ($R_{62}$ and $R_{63}$ the same as those described above).

Among the ozone-resistance improvers, guanidine-based compounds are particularly preferable. Hereinafter, the guanidine-based compounds will be described in detail.

<Guanidine-Based Compound>

The guanidine-based compound for use in the invention is a compound having a N—C(=N)—N structure. The guanidine-based compound is preferably a compound represented by the following Formula (F):

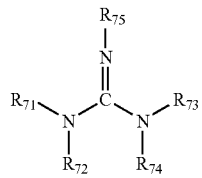

Formula (F)

In Formula (F), $R_{71}$, $R_{72}$, $R_{73}$, or $R_{74}$ each independently represents a hydrogen atom or an alkyl, alkoxy, aryl, heterocyclic, or amino group; and $R_{75}$ represents a hydrogen atom or an alkyl, alkoxy, aryl, or heterocyclic group. The alkyl, alkoxy, aryl, heterocyclic, or amino group may be substituted or unsubstituted.

The alkyl group is preferably a group having 1 to 12 carbon atoms, particularly preferably a group having 1 to 6 carbon atoms.

The alkoxy group is preferably a group having 1 to 12 carbon atoms, particularly preferably a group having 1 to 6 carbon atoms.

The aryl group is preferably a group having 6 to 18 carbon atoms, particularly preferably a group having 6 to 10 carbon atoms.

Examples of the heterocyclic groups include furyl, pyridyl, pyrimidyl, pyrrolyl, pyrrolinyl, pyrrolidyl, dioxolyl, pyrazolyl, pyrazolinyl, pyrazolidyl, imidazolyl, oxazolyl, thiazolyl, oxadiazolyl, triazolyl, thiadiazolyl, pyryl, pyridyl, pyperidyl, dioxanyl, morpholyl, pyridazyl, pyrazyl, piperazyl, triazyl, and trithianyl groups, and the like.

The alkyl groups, alkoxy groups, aryl groups, or heterocyclic groups represented by $R_{71}$ to $R_{75}$ include the groups of which the hydrogen atoms are substituted with any other substituent groups. Examples of the substituent groups include halogen atoms such as chlorine, a nitro group, an amino group, a carboxyl group, a hydroxyl group, a carbamoyl group, an amidino group, a guanidino group, aryloxy groups (the aryl group may be substituted additionally with the substituent groups listed herein), and the like; and two or more substituent groups may be present on the same molecule. The hydrogen atoms of the amino, carbamoyl, amidino, or guanidino group may be substituted with the alkyl, alkoxy, aryl, or heterocyclic group represented by $R_{71}$ to $R_{75}$. The hydrogen atoms of the amino groups represented by $R_{71}$ to $R_{74}$ may be substituted, for example, by the alkyl, alkoxy, aryl, or heterocyclic group represented by $R_{71}$ to $R_{75}$.

The guanidine-based compound may be in the form of salt or metal complex. Examples thereof include hydrochloride salt, nitrate salt, phosphate salt, sulfamate salt, carbonate salt, acetate salt, and the like.

The compound represented by Formula (F) is prepared specifically at least in the step of allowing ammonia to react with the hydrochloride salt of the corresponding imino ether.

The guanidine-based compound may be a polymer having a N—C(=N)—N structure. Examples of the polymers include, but are not limited to, compounds having the repeating unit represented by the following Formula (F-a), (F-b), or (F-c). The compound having the repeating unit above may be an oligomer. The compound having the repeating unit represented by Formula (F-c) may be a monomer. In addition, these compounds are preferably salts with acid.

Formula (F-a):

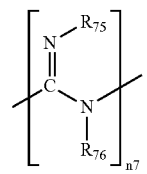

In Formula (F-a), $R_{75}$ is the same as that above; $R_{76}$ is $R_{71}$, $R_{72}$, $R_{73}$, or $R_{74}$; n pieces of $R_{75}$ and $R_{76}$ may be same as or different from each other. n7 is an integer of 2 or more, preferably 2 to 30, and more preferably 2 to 15. The compound having the repeating unit represented by Formula (F-a) may be a homopolymer or a copolymer having another repeating unit such as azetidinium. The terminal structure may be properly selected, but is preferably a hydrogen atom or an alkyl, alkoxy, aryl, heterocyclic, or amino group.

Formula (F-b):

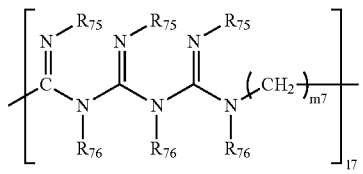

In Formula (F-b), $R_{75}$ and $R_{76}$ are the same as those described above; and l7 pieces of $R_{75}$ and $R_{76}$ may be the same as or different from each other. l7 is an integer of 2 or more, preferably 2 to 10, and more preferably 2 to 5. m7 is an integer of 1 or more, preferably 1 to 6, and more preferably 1 to 3. The compound having the repeating unit represented by (F-b) may be a homopolymer or a copolymer having another repeating unit such as azetidinium. The terminal structure may be properly selected, but is preferably a hydrogen atom or an alkyl, alkoxy, aryl, heterocyclic, or amino group.

Formula (F-c):

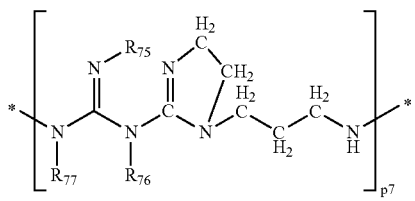

In Formula (F-c), R is the same as that described above; $R_{77}$ is the same as $R_{71}$ or $R_{72}$; $R_{78}$ is the same as $R_{73}$ or $R_{74}$; p7 pieces of $R_{75}$, $R_{77}$ and $R_{78}$ may be the same as or different from each other. P is an integer of 1 or more, preferably 1 to 10, and more preferably 1 to 5. The compound having the repeating unit represented by (F-c) may be a homopolymer or a copolymer having another repeating unit such as azetidinium. The terminal structure may be properly selected, but is preferably a hydrogen atom or an alkyl, alkoxy, aryl, heterocyclic, or amino group.

The methods of preparing an inkjet ink composition are described in detail in JP-A Nos. 5-148436, 5-295312, 7-97541, 7-82515, 7-118584, and 2004-331871, and are applicable also to the water-soluble ink according to the invention.

In preparation of the ink, the ink may be ultrasonicated, for example, in the step of dissolving additives such as dye, as described in JP-A No. 2004-331871.

In preparation of the ink according to the invention, important is the step of separating undesirable solid content by filtration after preparation of the ink solution. The filtration step is also described in JP-A No. 2004-331871.

The water-soluble ink according to the invention can be used independently of the inkjet-recording method, for example, in any known methods, including an electric charge-controlled method for ejecting ink by electrostatic attraction, a drop-on-demand method (pressure pulse method) of using the vibrational pressure of a piezoelectric element, an acoustic inkjet method for ejecting ink by converting signals into acoustic beams, irradiating the beams on ink, and generating an acoustic radiation pressure, a thermal inkjet method for forming air bubbles formed by the pressure generated by heating ink, and the like. Among them, use by the pressure pulse method or thermal inkjet method is preferable.

The inkjet-recording methods also include a method for ejecting a so-called photo ink, which is lower in concentration, multiple times in droplets in smaller volume, improving image quality by using multiple different inks that are substantially the same in color tone and concentration, and using a transparent and colorless ink.

The size of the ink droplet ejected is preferably in the range of 0.1 to 30 pl. (picoliter; the same shall apply hereinafter), more preferably in the range of 1 to 20 pl. A smaller ejected ink droplet size is favorable for recording of high-quality image, but also leads to discoloration of the recorded image under the influence of light or gas (in particular, ozone gas), however, on the contrary, the invention gives favorable ozone resistance when the droplet size is in the above range.

The recorded matter according to the invention is an inkjet-recording matter according to the invention described above carrying an ink image recorded by the inkjet-recording method according to the invention described above. The recorded matter is prevented from image blurring over time and superior in ozone resistance, because the water-soluble phthalocyanine dye is used as the colorant in the inkjet-recording medium according to the invention.

Hereinafter, favorable embodiments of the invention will be described.

<1> An inkjet-recording method of recording an image on an ink-receiving layer, comprising ejecting ink droplets of a water-soluble ink containing a water-soluble phthalocyanine dye on the ink-receiving layer of an inkjet-recording medium having a substrate and an ink-receiving layer formed thereon containing a water-soluble bivalent metal salt in an amount of 0.01 to 2 g/m².

<2> The inkjet-recording method described in <1>, wherein the water-soluble bivalent metal salt is at least one of water-soluble magnesium and calcium salts.

<3> The inkjet-recording method described in <1> or <2>, wherein the water-soluble phthalocyanine dye is a dye having a molar extinction coefficient $\epsilon 1$, as determined from the absorbance at the maximum wavelength in the spectroscopic absorption curve when an aqueous solution of the dye at a concentration of 0.1 mmol/l is measured by using a cell having an optical path length of 1 cm, and a molar extinction coefficient $\epsilon 2$, as determined from the absorbance at the maximum wavelength in the spectroscopic absorption curve when an aqueous solution of the dye at a concentration of 0.2 mmol/l is measured by using a cell having an optical path length of 5 μm, satisfying the relationship $\epsilon 1/\epsilon 2 > 1.2$.

<4> The inkjet-recording method described in any one of <1> to <3>, wherein at least one of the water-soluble phthalocyanine dyes is at least one compound selected from the compounds represented by the following Formula (1) and the salts thereof.

Formula (1)

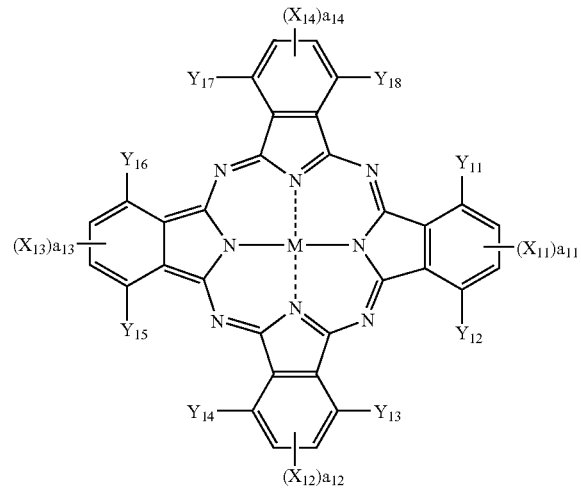

In the Formula (1), $X_{11}$, $X_{12}$, $X_{13}$ and $X_{14}$ each independently represents —SO—Z, —SO$_2$—Z, —SO$_2$NR$_{11}$R$_{12}$, a sulfo group, —CONR$_{11}$R$_{12}$, or —CO$_2$R$_{11}$. Each Z independently represents an alkyl, alkenyl, aralkyl, aryl, or heterocyclic group that may be substituted additionally with substituent groups. $R_{11}$ and $R_{12}$ each independently represents a hydrogen atom or an alkyl, alkenyl, aralkyl, aryl, or heterocyclic group that may be substituted additionally with substituent groups. $Y_{11}$, $Y_{12}$, $Y_{13}$, $Y_{14}$, $Y_{15}$, $Y_{16}$, $Y_{17}$, and $Y_{18}$ each independently represents a hydrogen atom or a monovalent substituent group. $a_{11}$, $a_{12}$, $a_{13}$, and $a_{14}$ each independently represents the substituent-group number of $X_{11}$ to $X_{14}$, an integer of 1 or 2. M represents a hydrogen atom, a metal atom, or the oxide, hydroxide or halide thereof.

<5> The inkjet-recording method of claim 4, wherein in the Formula (1), at least one of $X_{11}$ to $X_{14}$ is a water-soluble group and at least one of $X_{11}$ to $X_{14}$ is a hydrogen-bonding group.

<6> The inkjet-recording method of claim 5, wherein in the Formula (1), a numerical ratio of water-soluble group (x)/hydrogen-bonding group (y) is (0<x<3)/(1<y<4).

<7> The inkjet-recording method described in any one of <1> to <4>, wherein at least one of the water-soluble phthalocyanine dyes is a mixture of the phthalocyanine compounds represented by the following Formula (2) having at least one unsubstituted sulfamoyl group and at least one substituted sulfamoyl group containing an ionic hydrophilic group.

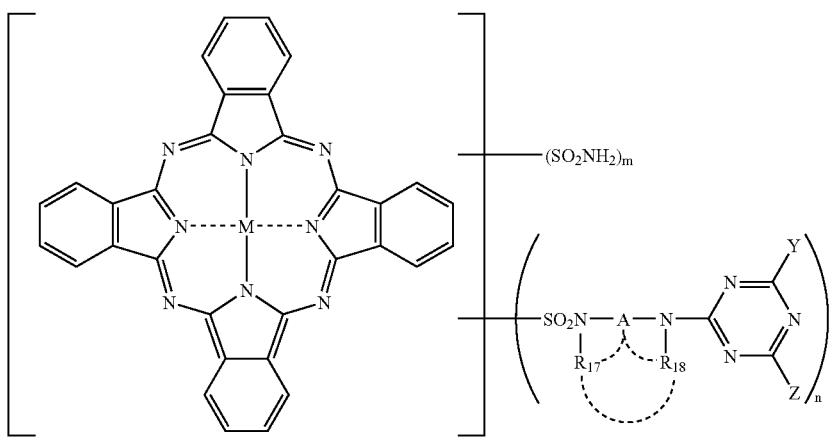

Formula (2)

In Formula (2) above, M represents a hydrogen atom, a metal atom, a metal oxide, a metal hydroxide or a metal halide; $R_{17}$ and $R_{18}$ each independently represents a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heterocyclic group, or a substituted or unsubstituted alkenyl group; A represents a crosslink group; and neighboring $R_{17}$, $R_{18}$, and A may bind to each other, forming a ring. Y and Z each independently represents a halogen atom, a hydroxyl group, a sulfonic acid group, a carboxyl group, an amino group, a substituted or unsubstituted alkoxy group, a substituted or unsubstituted cycloalkyloxy group, a substituted or unsubstituted aryloxy group, a substituted or unsubstituted heterocyclic oxy group, a substituted or unsubstituted aralkyloxy group, a substituted or unsubstituted alkenyloxy group, a substituted or unsubstituted alkylamino group, a substituted or unsubstituted cycloalkylamino group, a substituted or unsubstituted arylamino group, a substituted or unsubstituted heterocyclic amino group, a substituted or unsubstituted aralkylamino group, a substituted or unsubstituted alkenylamino group, a substituted or unsubstituted dialkylamino group, a substituted or unsubstituted alkylthio group, a substituted or unsubstituted arylthio group, a substituted or unsubstituted heterocyclic thio group, a substituted or unsubstituted aralkylthio group, or a substituted or unsubstituted alkenylthio group. However, at least one of Y and Z is a group having a sulfonic acid group, a carboxyl group, or an ionic hydrophilic group as its substituent group. m and n each independently represents 1 to 3, and the sum of m and n is 2 to 4.

<8> The inkjet-recording method described in any one of <1> to <5>, wherein the water-soluble bivalent metal salt is at least one of magnesium chloride, magnesium sulfate, magnesium nitrate, and calcium chloride.

<9> The inkjet-recording method described in any one of <1> to <6>, wherein the ink-receiving layer further comprises a water-soluble binder.

<10> The inkjet-recording method described in <9>, wherein the water-soluble binders is polyvinylalcohol.

<11> The inkjet-recording method described in any one of <1> to <7>, wherein the ink-receiving layer further comprises a crosslinking agent.

<12> The inkjet-recording method described in <11>, wherein the crosslinking agent is boric acid.

<13> The inkjet-recording method described in <1>, wherein the ink-receiving layer further comprises a particle.

<14> The inkjet-recording method described in any one of <1> to <8>, wherein the inkjet-recording medium is produced by forming an ink-receiving layer on a substrate, by forming a coated layer by coating a first solution containing a water-soluble binder and a crosslinking agent crosslinking the water-soluble binder, crosslinking and hardening the coated layer by applying a second solution containing a basic compound on the coated layer either (1) simultaneously with application of the first solution or (2) in the period before the coated layer shows a falling drying rate during drying of the coated layer.

<15> The inkjet-recording method described in any one of <1> to <14>, wherein the second solution contains the water-soluble metal salt.

<16> An inkjet-recorded material, recorded by the inkjet-recording method described in any one of <1> to <15>.

EXAMPLES

The invention will now be explained with reference to specific Examples below, however the invention is not limited by these examples. In addition, a sheet for inkjet-recording is prepared as an example of the inkjet-recording medium in the Example. In the Examples "parts", and "%" refer to parts by mass or mass %.

Example 1

(Support Body Manufacture)

50 parts of LBKP derived from acacia and 50 parts of LBKP derived from aspen are each processed by beating in a disc refiner until the Canadian freeness is 300 ml.

To the obtained pulp slurry is added, relative to the pulp, 1.3% of cationic starch (trade name: CATO 304L; manufactured by National Starch and Chemical Japan), 0.15% anionic polyacrylamide (trade name: POLYACRON ST-13, manufactured by Seiko PMC Corporation), 0.29% alkyl ketene dimer (trade name: SIZEPINE K, manufactured by Arakawa Chemical Industries), 0.29% epoxidated behenic acid amide, and 0.32% polyamide-polyamine-epichlorohydrine (trade name: ARAFIX 100; manufactured by Arakawa Chemical Industries). Following that 0.12% of an anti-foaming agent is added.

The above prepared pulp slurry is then made into paper using a Fourdrinier paper machine, and in a drying process the felt surface of the web is pressed against a drum dryer via a dryer canvas, with the dryer canvas tension adjusted to 1.6 kg/cm. After drying, the base paper is size pressed on both surfaces with polyvinyl alcohol (trade name: KL-118; manufactured by Kuraray Company Ltd.) coated at rate of 1 g/m$^2$, dried, and calender processed. The base paper manufactured has a basis weight of 166 g/m$^2$ and a base paper (substrate paper) with a thickness of 160 µm is obtained.

After undertaking corona electrical discharge treatment of the wire surface (back surface) of the substrate paper, the surface is coated to a thickness of 25 µm with high density polyethylene using a melt extrusion machine, and the thermoplastic resin layer is formed on what was the matt surface (from now on this thermoplastic resin layer surface will be referred to as the 'back surface'). Further corona electrical discharge treatment is carried out on this back surface. Then, as an anti-static agent, aluminium oxide (trade name: ALUMINASOL 100; manufactured by Nissan Chemical Industries Ltd) and silicon dioxide (trade name: SNOWTEX 0; manufactured by Nissan Chemical Industries Ltd) at a mass ratio of 1:2 is dispersed in water to form a treatment solution and coated to a dry weight of 0.2 g/m$^2$. Continuing, the front surface is corona treated, and using a melt extrusion machine coated to 24 g/m$^2$ with polyethylene containing titanium oxide 10% by mass of a density 0.93 g/cm$^3$ to give a support (hereinafter, the polyethylene layer surface will be called "front surface").

—Preparation of Inkjet-Recording Sheet—

1) Preparation of Silica Dispersion

Vapor-phase silica fine particles (1), ion-exchange water (2), "SHAROLL DC-902P" (3), and "ZA-30" (4) in the following composition were mixed and dispersed in a bead mill KD-P (manufactured by Jinmaru Enterprises), and the dispersion was then heated to 45° C. and kept at the same temperature for 20 hours, to give a silica dispersion.

<Composition>
(1) Vapor-phase silica fine particles 15.0 parts
(AEROSIL300SF75, manufactured by Japan Aerosil Co., Ltd.)
(2) Ion-exchange water 82.9 parts
(3) SHAROLL DC-902P (51.5% aqueous solution) 1.31 part
(dispersant, manufactured by Dai-ichi Kogyo Seiyaku Co., Ltd.)
(4) ZA-30 (zirconyl acetate) 0.8 parts
(manufactured by Daiichi Kigenso Kagaku Kogyo Co., Ltd.)

2) Preparation of Ink-Receiving-Layer Coating Solution a (First Solution)

Butycenol 20P (5), SC-505 (dimethylamine-epichlorohydrin-polyalkylene polyamine polycondensate) (6), boric acid (7), polyvinylalcohol solution (8), and a synthetic alcohol (9) in the following composition were added to 59.5 parts of the silica dispersion obtained at 30° C., and ion-exchange water (10) was added finally thereto, to give an ink-receiving-layer coating solution A (first solution).

<Composition of Ink-Receiving-Layer Coating Solution A>
Silica dispersion 59.5 parts
(5) Butycenol 20P 0.6 parts
(diethylene glycol monobutylether, manufactured by Kyowa Hakko Chemical Co., Ltd.;)
(6) SC-505 (50% aqueous solution) 0.2 parts (dimethylamine-epichlorohydrin-polyalkylene polyamine polycondensate, manufactured by Hymo Co.,)
(7) Boric acid (crosslinking agent) 4.0 parts
(8) Polyvinylalcohol (water-soluble binder) solution 26.0 parts
<Composition of Solution>
PVA-235 (saponification value: 88%, polymerization degree: 3,500; manufactured by Kuraray Co., Ltd.) 1.8 parts
Emulgen 109P 0.06 parts
(polyoxyethylene laurylether (surfactant); manufactured by Kao Corp.)
Ion-exchange water 23.8 parts
(9) Synthetic alcohol AP-7 4.1 parts
(manufactured by Japan Alcohol Corp.)
(10) Ion-exchange water 5.94 parts 3) Inkjet Recording Sheet Manufacture After electrical discharge corona treatment of the front surface of the support body prepared as above, then coating is carried out with a flow of the first solution so as to form a coating layer of 173 ml/m$^2$, and using in-line mixing with a polychloride aluminum aqueous solution dilute to 5 fold (Trade name: ALUFINE 83; manufactured by Taimei Chemicals Co. Ltd.) with a speed of 10.8 ml/m$^2$. This is then dried until the solid content of the coating layer is 20% using a heated drying machine at 80° C. (air speed between 3 and 8 m/s). This coated layer exhibits a constant rate of drying during this period. Before the drying rate decreases, the basic solution B (second solution) of the composition described below is applied to the ink receiving layer and allowed to soak in for a period of 2 seconds to achieve an application rate of 15 g/m$^2$. Then further drying is carried out at 80° C. for 10 minutes (curing process). As a result of this an ink receiving layer (recording layer) is coated giving a dry film thickness of 35 µm.

<Composition of Basic Solution B>
(1) Boric acid 0.65 parts
(2) zirconium ammonium carbonate 1.18 parts
(ZIRCOSOL AC-7 (28% aqueous solution), manufactured by Daiichi Kigenso Kagaku Kogyo Co., Ltd.)
(3) Ammonium carbonate (First-class, manufactured by Kanto Chemical Co. Inc.) 5.0 parts
(4) Ion-exchange water 86.5 parts
(5) Magnesium chloride (water-soluble metal salt) 0.67 parts (coating amount: 0.1 g/m$^2$)
(6) Polyoxyethylene laurylether 6.0 parts
(Emulgen 109P (10% aqueous solution), a surfactant manufactured by Kao Corp.)

Example 2

An inkjet-recording sheet was prepared in a similar manner to Example 1, except that magnesium chloride in the composition of the basic solution B in Example 1 was replaced with calcium chloride (water-soluble metal salt).

Example 3

An inkjet-recording sheet was prepared in a similar manner to Example 1, except that 0.67 parts (coating amount: 0.1 g/m$^2$) of magnesium chloride in the composition of the basic solution B in Example 1 was replaced with 2.0 parts (coating amount: 0.3 g/m²; water-soluble metal salt) of magnesium sulfate and the balance was adjusted with ion-exchange water.

Example 4

An inkjet-recording sheet was prepared in a similar manner to Example 1, except that 0.67 parts (coating amount: 0.1 g/m²) of magnesium chloride in the composition of the basic solution B in Example 1 was replaced with 2.0 parts (coating amount: 0.3 g/m²; water-soluble metal salt) of magnesium nitrate.

Example 5

An inkjet-recording sheet was prepared in a similar manner to Example 1, except that magnesium chloride was not added to the basic solution B in Example 1 and 0.29 parts of magnesium chloride (coating amount: 0.5 g/m²) was added to the ink-receiving-layer coating solution A.

Comparative Example 1

An inkjet-recording sheet was prepared in a similar manner to Example 1, except that magnesium chloride was not added to the basic solution B in Example 1.

Comparative Example 2

An inkjet-recording sheet was prepared in a similar manner to Example 1, except that the amount of magnesium chloride added to the basic solution B in the composition of Example 1 was changed from 0.67 parts (coating amount: 0.1 g/m²) to 16.7 parts (coating amount 2.5 g/m²) and the balance was adjusted with ion-exchange water.

—Preparation of Ink Composition—

The components in the compositions shown in the following Table 1 were mixed and stirred at normal temperature for 30 minutes, and the solution obtained was filtered through a membrane filter having an opening of 1.0 μm, to give cyan inks C-1 to C-5. The number of each component in the following Table 1 is a content (%) with respect to 100% of the total mass, and the "balance" of water is an amount to make a total of 100% with components other than water.

TABLE 1

|  | ε1/ε2 | C-1 | C-2 | C-3 | C-4 | C-5 |
|---|---|---|---|---|---|---|
| CYAN-1 | 1.26 | 5 | 3 |  |  |  |
| CYAN-2 | 1.31 |  | 2 | 5 |  |  |
| CYAN-3 | 1.23 |  |  |  | 5 |  |
| C.I.Drect Blue 199 | 1.15 |  |  |  |  | 5 |
| Glycerin |  | 12 | 12 | 12 | 12 | 12 |
| Triethylene glycol |  | 11 | 11 | 11 | 11 | 11 |
| Propylene glycol |  |  | 2 |  | 2 | 2 |
| TEGmBE |  | 9 | 9 | 9 | 9 | 9 |
| Surfynol 465 (*1) |  | 1 | 1 | 1 | 1 | 1 |
| Urea |  | 2 | 2 | 2 | 2 | 2 |
| Bronze inhibitor |  |  | 1 | 1 |  |  |
| 1,2-Hexanediol |  | 2 | 2 | 2 | 2 | 2 |
| Triethanolamine |  | 0.1 | 0.1 | 0.1 | 0.1 | 0.1 |
| 2-Pyrrolidone |  | 4 | 4 | 4 | 4 | 4 |
| PROXEL XL2 (*2) |  | 0.1 | 0.1 | 0.1 | 0.1 | 0.1 |
| Water |  | Balance | Balance | Balance | Balance | Balance |

(*1), Manufactured by Air Products and Chemical, Inc.
(*2), Manufactured by Avecia
Unit: %

The structures of CYAN-1, CYAN-2, CYAN-3, and bronze inhibitor in Table 1 above are shown below.

CYAN-1:

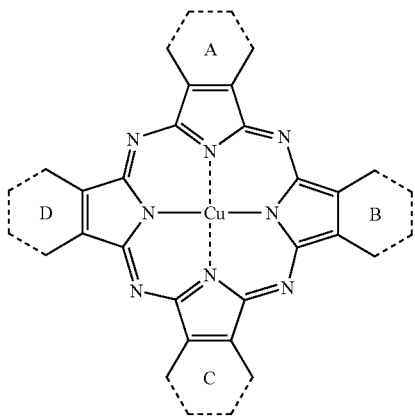

One of the rings A to D represents:

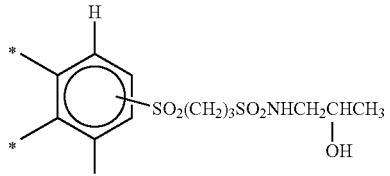

The other three rings represent:

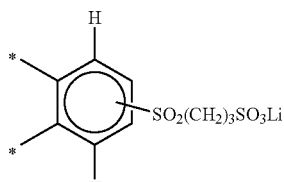

* binding sites on phthalocyanine ring

* CYAN-2:

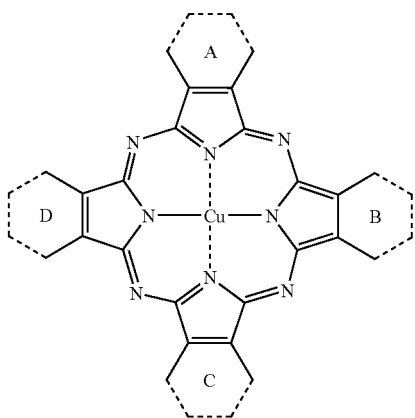

Two or the rings A to D represent:

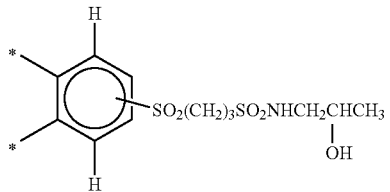

-continued

The other two represent:

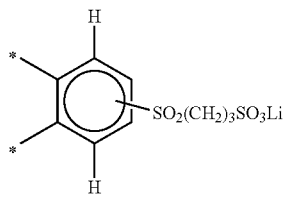

* binding sites on phthalocyanine ring

* CYAN-3

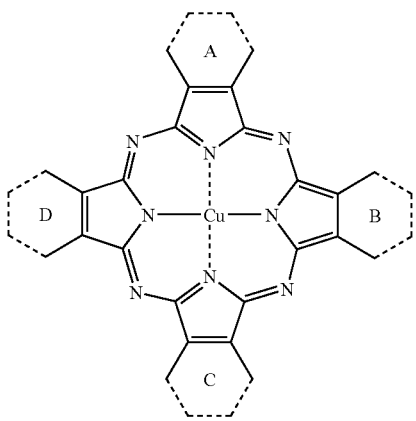

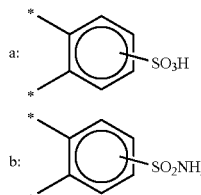

* binding sites on phthalocyanine ring

Mixture of the following compounds I to III:

I. c=0, a+b=4
II. c=1, a+b=3
III. c=2, a+b=2

* Bronze inhibitor:

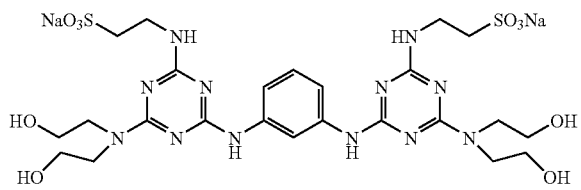

(Evaluation)

The inkjet-recording sheets obtained in the Examples and Comparative Examples were evaluated in the following tests. Evaluation results are summarized in the following Table 2.

1. Ozone Resistance (Ozone Resistance of Cyan and Magenta Dyes)

Stepwise patterns different in image density from light to dark in various colors were recorded on each of the inkjet-recording sheets obtained in an inkjet printer PM-A700 manufactured by Seiko Epson Corporation. The cyan inks C-1 to C-5 were used then as the cyan inks, and standard inks for PM-A700 were used as the magenta and the black inks. The density (Ci) of the stepwise pattern immediately after printing at a reference point was determined by using densitometer X-rite 938 (manufactured by X-rite) equipped with a status A filter. Then, each of the inkjet-recording sheet carrying the recorded stepwise pattern was placed in a box containing ozone gas at a concentration adjusted to 10 ppm, and left under the ozone atmosphere for 48 hours. Then, the density (Cf) at the reference point of each inkjet-recording sheet removed from the ozone atmosphere was determined; and a residual dye rate (%, Cf/Ci×100) was determined and used as an indicator of the ozone resistance evaluation.

The concentration of ozone gas in the box was monitored by using a ozone gas monitor (model: OZG-EM-01) manufactured by APPLICS.

(1) Cyan

The residual dye rate (%) of cyan-colored stepwise patterns at the reference point where Dvis was 1.0 was determined after exposure for 48 hours, and the results were evaluated according to the following criteria A to E:

A: Residual ratio: 70% or more
B: Residual ratio: 65% or more and less than 70%
C: Residual ratio: 60% or more and less than 65%
D: Residual ratio: 55% or more and less than 60%
E: Residual ratio: less than 55%

(2) Magenta

The residual dye rate (%) of magenta-colored stepwise patterns at the reference point where Dvis was 1.0 was determined after exposure for 48 hours, and the results were evaluated according to the following criteria A to D:

A: Residual ratio: 80% or more
B: Residual ratio: 75% or more and less than 80%
C: Residual ratio: 70% or more and less than 75%
D: Residual ratio: less than 70%

(Ozone Resistance of Black Dye)

The ozone resistance of black dye was evaluated by recording a black solid image (image at R:0, G:0, and B:0 formed by using imaging software Photoshop manufactured by Adobe Systems Incorporated), exposing the image for 96 hours, and determining the residual dye rate (%) after exposure, according to the following criteria A to C:

A: Residual ratio: 85% or more
B: Residual ratio: 80% or more and less than 85%
C: Residual ratio: less than 80%

—2. Ink-Absorbing Efficiency—

A painted image was recorded on each inkjet-recording sheet by using Y (yellow), M (magenta), C (cyan), K (black), B (blue), G (green), or R (red) ink in an inkjet printer PM-G800 (manufactured by Seiko Epson Corporation); paper is pressed onto the printed face immediately after that (after approximately 10 seconds), and the ink-absorbing efficiency was determined by observing transfer of the ink to paper, according to the following evaluation criteria.

[Evaluation Criteria]

A: No ink transfer to paper.
B: Some ink transfer to paper.
C: Much ink transfer to paper.

TABLE 2

| Image-receiving paper | Ozone resistance Ink | | | | | | | Ink-absorbing efficiency |
|---|---|---|---|---|---|---|---|---|
| | Cyan | | | | | Magenta | Black | |
| | C-1 | C-2 | C-3 | C-4 | C-5 | | | |
| Example 1 | A | A | A | A | C | B | A | A |
| Example 2 | A | A | A | A | C | B | A | A |
| Example 3 | A | A | A | A | C | B | A | A |
| Example 4 | A | A | A | A | C | B | A | A |
| Example 5 | B | A | A | B | D | B | A | A |
| Comparative Example 1 | C | C | C | D | E | C | B | A |
| Comparative Example 2 | A | A | A | A | C | B | A | C |

As shown in Table 2 above, the image-receiving papers obtained in Examples were favorable in ink-absorbing efficiency and improved in ozone resistance. In contrast, it was not possible to obtain an inkjet-recording sheet favorable in ozone resistance as well as in ink-absorbing efficiency in Comparative Examples.

Various studies aimed at improving the quality of image by using a polyvalent metal or metal salt are made as described above, but it is not possible to preserve the ozone resistance of image only by adding a polyvalent metal, metal salt, or the like when a dye, in particular a phthalocyanine dye, is used as the colorant, although it is possible to satisfy various requirements and improve the quality of image to some extent.

The invention provides an inkjet-recording method giving a recorded image superior in ozone resistance, and an inkjet-recording material.

All publications, patent applications, and technical standards mentioned in this specification are herein incorporated by reference to the same extent as if each individual publication, patent application, or technical standard was specifically and individually indicated to be incorporated by reference.

What is claimed is:

1. An inkjet-recording method of recording an image on an ink-receiving layer, comprising ejecting ink droplets of a water-soluble cyan ink containing a water-soluble phthalocyanine dye on the ink-receiving layer of an inkjet-recording medium having a substrate and an ink-receiving layer containing a water-soluble bivalent metal salt in an amount of 0.01 to 2 g/m2 formed on the substrate, wherein the inkjet-recording medium is produced by forming the ink-receiving layer on a substrate by forming a coated layer by coating a first solution comprising a water-soluble binder and a crosslinking agent crosslinking the water-soluble binder, crosslinking and hardening the coated layer by applying a second solution containing a basic compound on the coated layer either (1) simultaneously with application of the first solution or (2) in the period before the coated layer shows a falling drying rate during drying of the coated layer.

2. The inkjet-recording method of claim 1, wherein the water-soluble bivalent metal salt is at least one of a water-soluble magnesium salt and a water-soluble calcium salt.

3. The inkjet-recording method of claim 1, wherein the water-soluble phthalocyanine dye is at least one compound selected from the compounds represented by the following Formula (1) and the salts thereof:

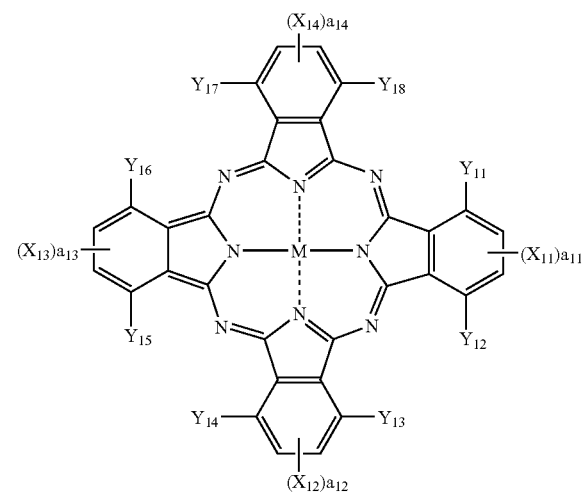

Formula (1)

wherein, in Formula (1), $X_{11}$, $X_{13}$, $X_{13}$ and $X_{14}$ each independently represents —SO—Z, —SO$_2$—Z, —SO$_2$NR$_{11}$R$_{12}$, a sulfo group, —CONR$_{11}$R$_{12}$, or —CO$_2$R$_{11}$; each Z independently represents an alkyl, alkenyl, aralkyl, aryl, or heterocyclic ring that may be substituted with substituent groups; $R_{11}$ and $R_{12}$ each independently represents a hydrogen atom, or an alkyl, alkenyl, aralkyl, aryl, or heterocyclic group that may be substituted additionally with substituent groups; $Y_{11}$, $Y_{12}$, $Y_{13}$, $Y_{14}$, $Y_{15}$, $Y_{16}$, $Y_{17}$, and $Y_{18}$ each independently represents a hydrogen atom or a monovalent substituent group; $a_{11}$, $a_{12}$, $a_{13}$, and $a_{14}$ each independently represents the substituent-group number of $X_{11}$ to $X_{14}$, or an integer of 1 or 2; and M represents a hydrogen atom, a metal atom or an oxide, hydroxide or halide thereof.

4. The inkjet-recording method of claim 3, wherein in the Formula (1), at least one of $X_{11}$ to $X_{14}$ is a water-soluble group and at least one of $X_{11}$ to $X_{14}$ is a hydrogen-bonding group.

5. The inkjet-recording method of claim 4, wherein in the Formula (1), a numerical ratio of water-soluble group(x)/hydrogen-bonding group(y) is (0<x<3)/(1<y<4).

6. The inkjet-recording method of claim 1, wherein the water-soluble phthalocyanine dye is a mixture of the phthalocyanine compounds represented by the following Formula (2) having at least one unsubstituted sulfamoyl group and at least one substituted sulfamoyl group containing an ionic hydrophilic group:

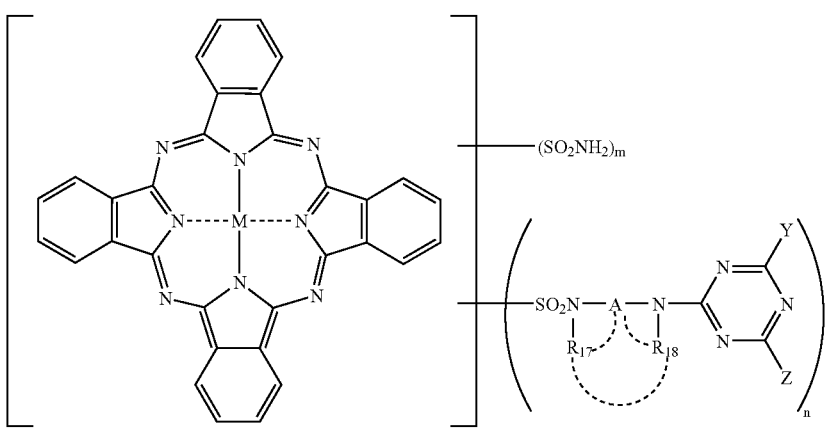

Formula (2)

wherein, in Formula (2), M represents a hydrogen atom, a metal atom, a metal oxide, a metal hydroxide or a metal halide; $R_{17}$ and $R_{18}$ each independently represents a hydrogen atom, a substituted or unsubstituted alkyl group, a substituted or unsubstituted cycloalkyl group, a substituted or unsubstituted aralkyl group, a substituted or unsubstituted aryl group, a substituted or unsubstituted heterocyclic group, or a substituted or unsubstituted alkenyl group; A represents a crosslink group; and neighboring $R_{17}$, $R_{18}$, and A may bind to each other, forming a ring; and Y and Z each independently represents a halogen atom, a hydroxyl group, a sulfonic acid group, a carboxyl group, an amino group, a substituted or unsubstituted alkoxy group, a substituted or unsubstituted cycloalkyloxy group, a substituted or unsubstituted aryloxy group, a substituted or unsubstituted heterocyclic oxy group, a substituted or unsubstituted aralkyloxy group, a substituted or unsubstituted alkenyloxy group, a substituted or unsubstituted alkylamino group, a substituted or unsubstituted cycloalkylamino group, a substituted or unsubstituted arylamino group, a substituted or unsubstituted heterocyclic amino group, a substituted or unsubstituted aralkylamino group, a substituted or unsubstituted alkenylamino group, a substituted or unsubstituted dialkylamino group, a substituted or unsubstituted alkylthio group, a substituted or unsubstituted arylthio group, a substituted or unsubstituted heterocyclic thio group, a substituted or unsubstituted aralkylthio group, or a substituted or unsubstituted alkenylthio group; however, at least one of Y and Z is a group having a sulfonic acid group, a carboxyl group, or an ionic hydrophilic group as its substituent group; and m and n each independently represents 1 to 3, and the sum of m and n is 2 to 4.

7. The inkjet recording method of claim 1, wherein the water-soluble bivalent metal salt is at least one of magnesium chloride, magnesium sulfate, magnesium nitrate, and calcium chloride.

8. The inkjet recording method of claim 1, wherein the ink-receiving layer further comprises a water-soluble binder.

9. The inkjet recording method of claim 8, wherein the water-soluble binder is polyvinylalcohol.

10. The inkjet recording method of claim 1, wherein the ink-receiving layer further comprises a crosslinking agent.

11. The inkjet recording method of claim 10, wherein the crosslinking agent is boric acid.

12. The inkjet recording method of claim 1, wherein the ink-receiving layer further comprises a particle.

13. The inkjet recording method of claim 1, wherein the second solution comprises the water-soluble metal salt.

14. An inkjet-recorded material, recorded by the inkjet-recording method claim 1.

15. The inkjet-recording method of claim 1, wherein the water-soluble phthalocyanine dye is a dye having a molar extinction coefficient $\epsilon 1$, as determined from the absorbance at the maximum wavelength in the spectroscopic absorption curve when an aqueous solution of the dye at a concentration of 0.1 mmol/l is measured by using a cell having an optical path length of 1 cm, and a molar extinction coefficient $\epsilon 2$, as determined from the absorbance at the maximum wavelength in the spectroscopic absorption curve when an aqueous solution of the dye at a concentration of 0.2 mmol/l is measured by using a cell having an optical path length of 5 μm, satisfying the relationship $\epsilon 1/\epsilon 2 > 1.2$.

* * * * *